(12) United States Patent
Tremaine

(10) Patent No.: US 7,490,217 B2
(45) Date of Patent: *Feb. 10, 2009

(54) DESIGN STRUCTURE FOR SELECTING MEMORY BUSSES ACCORDING TO PHYSICAL MEMORY ORGANIZATION INFORMATION STORED IN VIRTUAL ADDRESS TRANSLATION TABLES

(75) Inventor: Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/126,747

(22) Filed: May 23, 2008

(65) Prior Publication Data

US 2008/0270741 A1 Oct. 30, 2008

Related U.S. Application Data

(63) Continuation-in-part of application No. 11/464,503, filed on Aug. 15, 2006.

(51) Int. Cl.
*G06F 12/10* (2006.01)
(52) U.S. Cl. .......................... 711/207; 711/5; 711/208; 711/211
(58) Field of Classification Search ............... 711/5, 711/202, 205, 206, 207, 208, 209, 211, 217
See application file for complete search history.

(56) References Cited

U.S. PATENT DOCUMENTS 2,842,682 A  7/1958 Clapper
3,333,253 A  7/1967 Sahulka
3,395,400 A  7/1968 De Witt et al.

(Continued)

FOREIGN PATENT DOCUMENTS

EP        0470734 A1    2/1992

(Continued)

OTHER PUBLICATIONS

Boudon, et al., "Novel Bus Reconfiguration Scheme With Spare Lines", IBM Technical Disclosure Bulletin, May 1987, vol. 29, No. 12, pp. 1-3.

(Continued)

*Primary Examiner*—Jack A Lane
(74) *Attorney, Agent, or Firm*—Cantor Colburn LLP; Michael LeStrange

(57) ABSTRACT

Design structures for program directed memory access patterns. A design structure is embodied in a machine readable storage medium used in a design process, the design structure including a computer memory system for storing and retrieving data. The memory system includes a memory, a memory controller and a virtual memory management system. The memory includes a plurality of memory devices organized into one or more physical groups accessible via associated busses for transferring data and control information. The memory controller receives and responds to memory access requests that contain application access information to control access pattern and data organization within the memory. Responding to memory access request includes accessing one or more memory devices. The virtual memory management system includes: a plurality of page table entries for mapping virtual memory addresses to real addresses in the memory; a hint state responsive to application access information for indicating how real memory for associated pages is to be physically organized within the memory; and a means for conveying the hint state to the memory controller.

17 Claims, 13 Drawing Sheets

U.S. PATENT DOCUMENTS

| | | | | |
|---|---|---|---|---|
| 3,825,904 | A | 7/1974 | Burk et al. | 340/172.5 |
| 4,028,675 | A | 6/1977 | Frankenberg | 711/106 |
| 4,135,240 | A | 1/1979 | Ritchie | |
| 4,472,780 | A | 9/1984 | Chenoweth et al. | |
| 4,475,194 | A | 10/1984 | LaVallee et al. | 371/10 |
| 4,486,739 | A | 12/1984 | Franaszek et al. | 340/347 |
| 4,641,263 | A | 2/1987 | Perlman et al. | |
| 4,654,857 | A | 3/1987 | Samson et al. | 371/68 |
| 4,723,120 | A | 2/1988 | Petty, Jr. | 340/825.02 |
| 4,740,916 | A | 4/1988 | Martin | 364/900 |
| 4,796,231 | A | 1/1989 | Pinkham | 365/189.05 |
| 4,803,485 | A | 2/1989 | Rypinkski | 370/452 |
| 4,833,605 | A | 5/1989 | Terada et al. | 364/200 |
| 4,839,534 | A | 6/1989 | Clasen | 307/269 |
| 4,943,984 | A | 7/1990 | Pechanek et al. | 375/109 |
| 4,985,828 | A | 1/1991 | Shimizu et al. | 364/200 |
| 5,053,947 | A | 10/1991 | Heibel et al. | 364/200 |
| 5,177,375 | A | 1/1993 | Ogawa et al. | |
| 5,206,946 | A | 4/1993 | Brunk | 710/2 |
| 5,214,747 | A | 5/1993 | Cok | 395/27 |
| 5,265,212 | A | 11/1993 | Bruce, II | 710/113 |
| 5,287,531 | A | 2/1994 | Rogers, Jr. et al. | 395/800 |
| 5,347,270 | A | 9/1994 | Matsuda et al. | 340/2.21 |
| 5,357,621 | A | 10/1994 | Cox | 711/172 |
| 5,375,127 | A | 12/1994 | Leak et al. | |
| 5,387,911 | A | 2/1995 | Gleichert et al. | 341/95 |
| 5,394,535 | A | 2/1995 | Ohuchi | 711/155 |
| 5,454,091 | A * | 9/1995 | Sites et al. | 711/203 |
| 5,475,690 | A | 12/1995 | Burns et al. | 370/105.3 |
| 5,513,135 | A | 4/1996 | Dell et al. | 365/52 |
| 5,517,626 | A | 5/1996 | Archer et al. | 395/290 |
| 5,522,064 | A | 5/1996 | Aldereguia et al. | |
| 5,544,309 | A | 8/1996 | Chang et al. | 395/183.06 |
| 5,546,023 | A | 8/1996 | Borkar et al. | |
| 5,561,826 | A | 10/1996 | Davies et al. | |
| 5,592,632 | A | 1/1997 | Leung et al. | 395/306 |
| 5,594,925 | A | 1/1997 | Harder et al. | 395/863 |
| 5,611,055 | A | 3/1997 | Krishan et al. | 395/281 |
| 5,613,077 | A | 3/1997 | Leung et al. | 395/306 |
| 5,627,963 | A | 5/1997 | Gabillard et al. | 714/42 |
| 5,629,685 | A | 5/1997 | Allen et al. | 340/825.22 |
| 5,661,677 | A | 8/1997 | Rondeau, II et al. | 365/63 |
| 5,666,480 | A | 9/1997 | Leung et al. | 395/180 |
| 5,684,418 | A | 11/1997 | Yanagiuchi | |
| 5,706,346 | A | 1/1998 | Katta et al. | 380/10 |
| 5,764,155 | A | 6/1998 | Kertesz et al. | 340/825.08 |
| 5,822,749 | A | 10/1998 | Agarwal | 707/2 |
| 5,852,617 | A | 12/1998 | Mote, Jr. | 714/726 |
| 5,870,325 | A | 2/1999 | Nielsen et al. | 365/63 |
| 5,872,996 | A | 2/1999 | Barth et al. | 395/853 |
| 5,917,760 | A | 6/1999 | Millar | |
| 5,926,838 | A | 7/1999 | Jeddeloh | 711/167 |
| 5,928,343 | A | 7/1999 | Farmwald et al. | 710/104 |
| 5,930,273 | A | 7/1999 | Mukojima | 714/776 |
| 5,959,914 | A | 9/1999 | Gates et al. | 365/201 |
| 5,973,951 | A | 10/1999 | Bechtolsheim et al. | 365/52 |
| 5,974,493 | A | 10/1999 | Okumura et al. | 710/307 |
| 5,995,405 | A | 11/1999 | Trick | 365/63 |
| 6,003,121 | A | 12/1999 | Wirt | |
| 6,011,732 | A | 1/2000 | Harrison et al. | 365/194 |
| 6,038,132 | A | 3/2000 | Tokunaga et al. | 361/760 |
| 6,049,476 | A | 4/2000 | Laudon et al. | 365/52 |
| 6,076,158 | A | 6/2000 | Sites et al. | 712/230 |
| 6,078,515 | A | 6/2000 | Nielsen et al. | 365/63 |
| 6,081,868 | A | 6/2000 | Brooks | |
| 6,085,276 | A | 7/2000 | VanDoren et al. | |
| 6,096,091 | A | 8/2000 | Hartmann | 716/17 |
| 6,128,746 | A | 10/2000 | Clark et al. | 713/324 |
| 6,145,028 | A | 11/2000 | Shank et al. | 710/31 |
| 6,170,047 | B1 | 1/2001 | Dye | 711/170 |
| 6,170,059 | B1 | 1/2001 | Pruett et al. | 713/200 |
| 6,173,382 | B1 | 1/2001 | Dell et al. | 711/170 |
| 6,185,718 | B1 | 2/2001 | Dell et al. | |
| 6,215,686 | B1 | 4/2001 | Deneroff et al. | 365/52 |
| 6,219,288 | B1 | 4/2001 | Braceras et al. | |
| 6,219,760 | B1 | 4/2001 | McMinn | |
| 6,260,127 | B1 | 7/2001 | Olarig et al. | 711/167 |
| 6,262,493 | B1 | 7/2001 | Garnett | |
| 6,292,903 | B1 | 9/2001 | Coteus et al. | 713/401 |
| 6,301,636 | B1 | 10/2001 | Schultz et al. | 711/108 |
| 6,317,352 | B1 | 11/2001 | Halbert et al. | 365/52 |
| 6,321,343 | B1 | 11/2001 | Toda | 713/600 |
| 6,338,113 | B1 | 1/2002 | Kubo et al. | 711/105 |
| 6,357,018 | B1 | 3/2002 | Stuewe et al. | |
| 6,530,007 | B2 | 3/2002 | Olarig et al. | |
| 6,370,631 | B1 | 4/2002 | Dye | 711/170 |
| 6,378,018 | B1 | 4/2002 | Tsern et al. | 710/129 |
| 6,381,685 | B2 | 4/2002 | Dell et al. | |
| 6,393,528 | B1 | 5/2002 | Arimilli et al. | 711/137 |
| 6,408,398 | B1 | 6/2002 | Freker et al. | |
| 6,442,698 | B2 | 8/2002 | Nizar | |
| 6,446,174 | B1 | 9/2002 | Dow | |
| 6,461,013 | B1 | 10/2002 | Nizar | |
| 6,473,836 | B1 | 10/2002 | Ikeda | 711/137 |
| 6,477,614 | B1 | 11/2002 | Leddige et al. | |
| 6,483,755 | B2 | 11/2002 | Leung et al. | 365/189.05 |
| 6,484,271 | B1 | 11/2002 | Gray | |
| 6,487,627 | B1 | 11/2002 | Willke et al. | 710/306 |
| 6,493,250 | B2 | 12/2002 | Halbert et al. | 365/63 |
| 6,496,540 | B1 | 12/2002 | Widmer | 375/242 |
| 6,496,910 | B1 | 12/2002 | Baentsch et al. | 711/165 |
| 6,499,070 | B1 | 12/2002 | Whetsel | 710/71 |
| 6,502,161 | B1 | 12/2002 | Perego et al. | 711/5 |
| 6,507,888 | B2 | 1/2003 | Wu et al. | 711/105 |
| 6,510,100 | B2 | 1/2003 | Grundon et al. | 365/233 |
| 6,513,091 | B1 | 1/2003 | Blackmon et al. | 710/316 |
| 6,526,469 | B1 | 2/2003 | Drehmel et al. | |
| 6,532,525 | B1 | 3/2003 | Aleksic et al. | 711/168 |
| 6,546,359 | B1 | 4/2003 | Week | 702/186 |
| 6,549,971 | B1 | 4/2003 | Cecchi et al. | 710/306 |
| 6,553,450 | B1 | 4/2003 | Dodd et al. | 711/105 |
| 6,557,069 | B1 | 4/2003 | Drehmel et al. | 710/307 |
| 6,564,329 | B1 | 5/2003 | Cheung et al. | 713/322 |
| 6,584,576 | B1 | 6/2003 | Co | 713/401 |
| 6,587,912 | B2 | 7/2003 | Leddige et al. | |
| 6,590,827 | B2 | 7/2003 | Chang et al. | |
| 6,594,748 | B1 | 7/2003 | Lin | |
| 6,601,121 | B2 | 7/2003 | Singh et al. | 710/112 |
| 6,601,149 | B1 | 7/2003 | Brock et al. | |
| 6,604,180 | B2 | 8/2003 | Jeddeloh | 711/169 |
| 6,611,902 | B2 | 8/2003 | Kuroda et al. | 711/167 |
| 6,611,905 | B1 | 8/2003 | Grundon et al. | |
| 6,622,217 | B2 | 9/2003 | Gharacorloo et al. | 711/141 |
| 6,625,687 | B1 | 9/2003 | Halber et al. | 711/105 |
| 6,625,702 | B2 | 9/2003 | Rentscler et al. | |
| 6,628,538 | B2 | 9/2003 | Funaba et al. | 365/63 |
| 6,631,439 | B2 | 10/2003 | Saulsbury et al. | |
| 6,671,376 | B1 | 12/2003 | Koto et al. | 380/210 |
| 6,675,280 | B2 | 1/2004 | Cooksey et al. | |
| 6,678,777 | B2 | 1/2004 | Rao et al. | |
| 6,678,811 | B2 | 1/2004 | Rentscler et al. | 711/167 |
| 6,684,320 | B2 | 1/2004 | Mohamed et al. | |
| 6,697,919 | B2 | 2/2004 | Gharacorloo et al. | 711/141 |
| 6,704,842 | B1 | 3/2004 | Janakiraman et al. | |
| 6,721,185 | B2 | 4/2004 | Dong et al. | |
| 6,721,944 | B2 | 4/2004 | Chaudhry et al. | |
| 6,735,669 | B2 | 5/2004 | Woo | |
| 6,738,836 | B1 | 5/2004 | Kessler et al. | |
| 6,741,096 | B2 | 5/2004 | Moss | |
| 6,754,762 | B1 | 6/2004 | Curley | 710/316 |
| 6,760,817 | B2 | 7/2004 | Arimilli et al. | |
| 6,766,389 | B2 | 7/2004 | Hayter et al. | |
| 6,775,747 | B2 | 8/2004 | Venkatraman | |
| 6,779,075 | B2 | 8/2004 | Wu et al. | 711/105 |

| | | |
|---|---|---|
| 6,791,555 B1 | 9/2004 | Radke et al. |
| 6,792,495 B1 | 9/2004 | Garney et al. |
| 6,807,650 B2 | 10/2004 | Lamb et al. ..................... 716/1 |
| 6,832,286 B2 | 12/2004 | Johnson et al. ............. 711/105 |
| 6,834,355 B2 | 12/2004 | Uzelac ........................ 713/300 |
| 6,839,393 B1 | 1/2005 | Sidiropoulos ................ 375/371 |
| 6,851,036 B1 * | 2/2005 | Toda et al. ................... 711/202 |
| 6,854,043 B2 | 2/2005 | Hargis et al. ................. 711/168 |
| 6,865,646 B2 | 3/2005 | David ......................... 711/128 |
| 6,871,253 B2 | 3/2005 | Greeff et al. ................. 710/316 |
| 6,874,102 B2 | 3/2005 | Doody et al. ................... 714/5 |
| 6,877,076 B1 | 4/2005 | Cho et al. |
| 6,877,078 B2 | 4/2005 | Fujiwara et al. |
| 6,882,082 B2 | 4/2005 | Greeff et al. |
| 6,889,284 B1 | 5/2005 | Nizar et al. |
| 6,898,726 B1 | 5/2005 | Lee ............................ 713/503 |
| 6,918,068 B2 | 7/2005 | Vail et al. ..................... 714/56 |
| 6,922,658 B2 | 7/2005 | Bohizic et al. |
| 6,938,119 B2 | 8/2005 | Kohn et al. |
| 6,944,084 B2 | 9/2005 | Wilcox |
| 6,948,091 B2 | 9/2005 | Bartels et al. ................. 714/11 |
| 6,949,950 B2 | 9/2005 | Takahashi et al. |
| 6,952,761 B2 * | 10/2005 | John ........................... 711/207 |
| 7,133,972 B2 | 11/2005 | Jeddeloh |
| 6,977,536 B2 | 12/2005 | Chin-Chieh et al. ......... 327/116 |
| 6,993,612 B2 | 1/2006 | Porterfield |
| 7,017,020 B2 | 3/2006 | Herbst et al. |
| 7,024,518 B2 | 4/2006 | Halbert et al. ............... 711/115 |
| 7,027,336 B2 | 4/2006 | Lee |
| 7,039,755 B1 | 5/2006 | Helms |
| 7,047,384 B2 | 5/2006 | Bodas et al. ................. 711/167 |
| 7,051,172 B2 | 5/2006 | Mastronarde et al. ....... 711/158 |
| 7,073,010 B2 | 7/2006 | Chen et al. ................... 710/313 |
| 7,076,700 B2 | 7/2006 | Rieger |
| 7,093,078 B2 | 8/2006 | Kondo ........................ 711/141 |
| 7,096,407 B2 | 8/2006 | Olarig ........................ 714/768 |
| 7,103,792 B2 | 9/2006 | Moon ......................... 713/500 |
| 7,113,418 B2 | 9/2006 | Oberlin et al. ................ 365/63 |
| 7,114,109 B2 | 9/2006 | Daily et al. ................. 714/724 |
| 7,127,629 B2 | 10/2006 | Vogt ........................... 713/500 |
| 7,133,790 B2 | 11/2006 | Liou |
| 7,136,958 B2 | 11/2006 | Jeddeloh ..................... 710/317 |
| 7,155,623 B2 | 12/2006 | Lefurgy et al. .............. 713/300 |
| 7,162,567 B2 | 1/2007 | Jeddeloh et al. ............. 711/154 |
| 7,165,153 B2 | 1/2007 | Vogt ........................... 711/154 |
| 7,177,211 B2 | 2/2007 | Zimmerman ................ 365/201 |
| 7,181,584 B2 | 2/2007 | LeBerge ..................... 711/167 |
| 7,194,593 B2 | 3/2007 | Schnepper .................. 711/154 |
| 7,197,594 B2 | 3/2007 | Raz et al. .................... 711/103 |
| 7,200,832 B2 | 4/2007 | Butt et al. ..................... 710/17 |
| 7,206,962 B2 | 4/2007 | Deegan |
| 7,216,196 B2 | 5/2007 | Jeddeloh |
| 7,227,949 B2 | 6/2007 | Heegard et al. ............... 380/37 |
| 7,234,099 B2 | 6/2007 | Gower et al. ................ 714/767 |
| 7,240,145 B2 | 7/2007 | Holman ......................... 711/5 |
| 7,260,685 B2 | 8/2007 | Lee et al. .................... 711/213 |
| 7,266,634 B2 | 9/2007 | Ware et al. |
| 7,290,190 B2 | 10/2007 | Obara ......................... 714/729 |
| 6,487,102 B1 | 11/2007 | Halbert et al. |
| 7,304,905 B2 | 12/2007 | Hsu et al. .................... 365/226 |
| 7,313,583 B2 | 12/2007 | Porten et al. ................. 708/492 |
| 7,321,979 B2 | 1/2008 | Lee |
| 7,331,010 B2 | 2/2008 | Dell et al. |
| 7,334,070 B2 | 2/2008 | Borkenhagen |
| 7,360,027 B2 | 4/2008 | Huggahalli et al. |
| 7,373,440 B2 | 5/2008 | Huppenthal et al. ........... 712/15 |
| 7,386,696 B2 | 6/2008 | Jakobs et al. |
| 7,412,566 B2 | 8/2008 | Lee et al. |
| 7,412,574 B2 | 8/2008 | Jeddeloh |
| 2002/0059439 A1 | 5/2002 | Arroyo et al. |
| 2002/0103988 A1 | 8/2002 | Dornier ........................ 712/38 |
| 2003/0033364 A1 | 2/2003 | Garnett et al. ............... 709/203 |
| 2003/0051055 A1 | 3/2003 | Parrella et al. |
| 2003/0056183 A1 | 3/2003 | Kobayashi |
| 2003/0084309 A1 | 5/2003 | Kohn .......................... 713/189 |
| 2003/0090879 A1 | 5/2003 | Doblar et al. |
| 2003/0177333 A1 * | 9/2003 | John ........................... 711/207 |
| 2004/0098549 A1 | 5/2004 | Dorst |
| 2004/0117588 A1 | 6/2004 | Arimilli et al. .............. 711/203 |
| 2004/0128474 A1 | 7/2004 | Vorbach ....................... 712/10 |
| 2004/0230718 A1 | 11/2004 | Polzin et al. ................... 710/22 |
| 2004/0260957 A1 | 12/2004 | Jeddeloh et al. ............. 713/300 |
| 2005/0023560 A1 | 2/2005 | Ahn et al. .................... 257/200 |
| 2005/0044305 A1 | 2/2005 | Jakobs et al. |
| 2005/0050237 A1 | 3/2005 | Jeddeloh et al. ............... 710/10 |
| 2005/0071542 A1 | 3/2005 | Weber et al. |
| 2005/0080581 A1 | 4/2005 | Zimmerman et al. ........ 702/117 |
| 2005/0086441 A1 | 4/2005 | Meyer et al. |
| 2005/0125702 A1 | 6/2005 | Huang et al. ................ 713/320 |
| 2005/0125703 A1 | 6/2005 | Lefurgy et al. |
| 2005/0138246 A1 | 6/2005 | Chen et al. |
| 2005/0138267 A1 | 6/2005 | Bains et al. ................. 711/100 |
| 2005/0144399 A1 | 6/2005 | Hosomi ...................... 711/145 |
| 2005/0149665 A1 | 7/2005 | Wolrich et al. |
| 2005/0166006 A1 | 7/2005 | Talbot et al. |
| 2005/0223196 A1 | 10/2005 | Knowles |
| 2005/0289377 A1 | 12/2005 | Luong et al. |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0095679 A1 | 5/2006 | Edirisooriya |
| 2006/0112238 A1 | 5/2006 | Jamil et al. ................. 711/145 |
| 2006/0161733 A1 | 7/2006 | Beckett et al. |
| 2006/0195631 A1 | 8/2006 | Rajamani |
| 2006/0288172 A1 | 12/2006 | Lee et al. |
| 2007/0025304 A1 | 2/2007 | Leelahakriengkrai et al. |
| 2007/0160053 A1 | 7/2007 | Coteus et al. |

FOREIGN PATENT DOCUMENTS

| | | |
|---|---|---|
| GB | 2396711 A | 6/2004 |
| JP | 59153353 | 9/1984 |
| JP | 04326140 | 11/1992 |
| JP | 10011971 | 1/1998 |
| WO | 00/04481 A | 1/2000 |
| WO | 2005/038660 A | 4/2005 |

OTHER PUBLICATIONS

Rosenberg, "Dictionary of Computers, Information Processing & Telecommuications", Second Edition, John Wiley & Sons, Inc. 1987. 3 pgs.

Singh, S., et al., "Bus Sparing for Fault-Tolerant System Design", IBM Technical Disclosure Bulletin, Dec. 1991, vol. 34, No. 71, pp. 117-118.

NB940259 (IBM Technical Disclosure Bulletin, Feb. 1994; vol. 37; pp. 59-64).

Nilsen, "High-Level Dynamic Memory Management for Object-Oriented Real-Time Systems", Jan. 1, 1996, pp. 86-93.

Massoud Pedram, "Power Minimization in IC Design Principles and Applications", ACM Transactions on Design Automation of Electronic Systems, vol. 1, No. 1, Jan. 1996, pp. 3-56.

Jungjoon Kim et al.; "Performance and Architecture Features of Segmented Multiple Bus System;" IEEE Computer Society; Sep. 21-24, 1999 International Conference on Parallel Processing (ICPP '99).

Benini, et al., "System-Level Powers Optimization: Techniques and Tools", ACM Transactions on Design Automation of Electronic Systems, vol. 5, No. 2, Apr. 2000, pp. 115-192.

P.R. Panda, "Data and Memory Optimization Techniques For Embedded Systems", ACM Transactions on Design Automation of Electronic Systems, vol. 6, No. 2, Apr. 2001, pp. 149-206.

Brown, et al "Compiler-Based I/O Prefetching for Out-of-Core Applications", ACM Transactions on Computer System, vol. 19, No. 2, May 2001, pp. 111-170.

IEEE, "IEEE Standard Test Access Port and Boundary-Scan Architecture", Jul. 23, 2001, IEEE Std 1149-1-2001, pp. 11-13.

Wang, et al., "Guided Region Prefetching: A Cooperative Hardware/Software Approach", Jun. 2003, pp. 388-398.

Seceleanu et al.; "Segment Arbiter as Action System;" IEEE Jul. 2003 pp. 249-252.

JEDEC Solid State Technology Association, "JEDEC Standard: DDR2 SDRAM Specification", Jan. 2004, JEDEC, Revision JESD79-2A, p. 10.

Natarajan, et al., "A Study of Performance Impact of Memory Controller Features in Multi-Processor Server Environment", Jun. 2004, pp. 80-87.

Sivencrona et al.; "RedCAN™: Simulations of two Fault Recovery Algorithms for CAN;" Proceedings for the 10th IEEE Pacific Rim International Symposium on Dependable Computing (PRDC'04); Mar. 3-5, 2005.

Ghoneima et al.; "Optimum-Positioning of Interleaved Repeaters in Bidirectional Buses;" IEEE Transactions on Computer-Aided Design of Integrated Circuits and Systems, vol. 25, No. 3, Mar. 2005, pp. 461-469.

Penrod, Lee, "Understanding System Memory and CPU Speeds: A laymans guide to the front Side Bus (FSB)", Dec. 28, 2005, Direction . Org, pp. 1-5, http://www.direction.com/direction/fsbguide.html. [online]; [retrieved on Feb. 23, 2006]; retrieved from the internet.

U.S. Appl. No. 11/419,586 filed May 22, 2006. Robert Tremaine. "Systems and Methods for Providing Remote Pre-Fetch Buffers".

Wikipedia, Serial Communications, [online], [retrieved Apr. 10, 2007 from the Internet], http://en.wikipedia.org/wiki/Serial_communications,p. 1.

PCT Search Report PCT/EP2006/068984. Mailed Feb. 9, 2007.
PCT Search Report PCT/EP2007/057915. Mailed Jul. 31, 2007.
PCT Search Report PCT/EP2007/057916. Mailed Dec. 14, 2007.
PCT Search Report PCT/EP2007/054929. Mailed Sep. 6, 2007.

* cited by examiner

DESIGN STRUCTURE FOR SELECTING MEMORY BUSSES ACCORDING TO PHYSICAL MEMORY ORGANIZATION INFORMATION STORED IN VIRTUAL ADDRESS TRANSLATION TABLES

CROSS REFERENCE TO RELATED APPLICATION

This application is a continuation in part application of U.S. Ser. No. 11/464,503, filed Aug. 15, 2006, the contents of which are incorporated by reference herein in their entirety.

BACKGROUND OF THE INVENTION

This invention relates generally to a design structure, and more particularly to a design structure for program directed memory access patterns.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the I/O subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of function is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered dual inline memory modules (DIMMs) 40 on a traditional multi-drop stub bus channel. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels were populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

Memory systems may utilize translation look aside tables in order to permit computer data to be stored in one or more storage locations best suited to data content, size and importance. Translation look aside tables (also commonly referred to as "virtual address translation tables" and "directory look aside tables") are used to convert virtual addresses into real addresses, thus allowing the implementation of a virtual memory system. FIG. 5, from U.S. Pat. No. 3,825,904 to Burk et al., of common assignment herewith, depicts a block diagram of a translation process from a virtual address to a real address. U.S. Pat. No. 3,825,904 also describes the use of a translation look aside table that includes a virtual address and a corresponding real address for translating between virtual and real addresses.

Most high performance computing main memory systems employ multiple banks of DRAM devices that are statically configured to have a group of banks participate to support an access across a memory interface, often comprised of parallel memory channels operating in unison. The memory channels, each generally including one or more busses, may include direct connections to DRAM devices, connections to one or more interface devices that are directly connected to DRAM devices, connections to one or more interface devices that are connected to DRAM devices, and/or include one or more high speed busses connected to memory hub devices, which themselves connect directly to memory devices or one or more alternative structures. This scheme of utilizing parallel channels in unison to access a group of banks minimizes latency by having all the available bandwidth allocated to each request, usually optimized for a cache line transfer of sixty-four to two hundred fifty-six bytes. Generally, the memory controller is responsible for generating and checking the error correction code (ECC) for the data that is distributed across the one or more channels.

Some memory systems provide a configuration that partitions the memory interface and interconnected memory banks so that they are able to operate independently, in order to increase the number of concurrent independent requests serviced at a given time. This can be beneficial where critical data is transferred first and the memory system is not heavily loaded, or where accesses tend to be short and the system provides a means to truncate the access. Moreover, certain data structures are best referenced as stride address or sparse reference patterns. However, applications could benefit (e.g., from a computing application performance standpoint) from both memory system access patterns, depending on the address ranges associated with specific processing and data structures. Therefore, what is needed is the ability for a computer application to be able to dynamically switch between different memory access patterns based on attributes associated with the data.

BRIEF SUMMARY OF THE INVENTION

An embodiment includes a design structure embodied in a machine readable medium used in a design process, the design structure including a computer memory system for storing and retrieving data. The memory system includes a memory, a memory controller and a virtual memory management system. The memory includes a plurality of memory devices organized into one or more physical groups, where each group is accessible via an associated bus for transferring data and control information. The memory controller receives and responds to memory access requests that contain application access information to control access pattern and data organization within the memory. Responding to memory access request includes accessing one or more memory devices in one or more of the physical groups via the associated busses. The virtual memory management system includes a plurality of page table entries for mapping virtual memory addresses to real addresses in the memory. The virtual memory management system also includes a hint state responsive to application access information for indicating how real memory for associated pages is to be physically organized within the memory; and a means for conveying the hint state to the memory controller when a memory access request is directed to the memory controller to access the memory.

Another embodiment includes a design structure embodied in a machine readable medium used in a design process. The design structure includes a memory system with a plurality of busses for transferring information to memory devices and a memory controller in communication with the busses. The memory controller receives memory access requests and initiates an information transfer on one or more of the busses to respond to the memory access requests. The memory controller determines on a cycle by cycle basis which of the busses are required to respond to each of the memory access requests based on a memory access pattern associated with each memory access request.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments may be implemented by computer memory systems that have two or more independent channels, with each channel including one or more busses interconnecting a memory controller to an array of memory devices. In exemplary embodiments, the memory controller directs requests for access to and from the memory devices via the appropriate channel(s) and associated bus(ses) to satisfy the requests. Requests to the memory controller include access "hints" that indicate how the memory controller should reference the data. These hints implicitly control how data is distributed in the physical memory for optimal reference. The data associated with the request may be stored/accessed via a single channel; across a combination of multiple channels; or across all channels attached to the memory controller. In exemplary embodiments, the memory controller can dynamically shift the channel utilization based on the access hint.

In exemplary embodiments, an application indicates to the memory controller how the data should be accessed (e.g., channel utilization and/or interleave method, the ECC encode/decode method, etc), implying the data organization and optimal access pattern. In exemplary embodiments, entries in a virtual address translation table (VATT) maintain states for defining how the data identified by a virtual address is mapped in the physical memory. This state is conveyed to the memory controller along with the real address and other attributes for the memory request. In exemplary embodiments, the access hint attribute(s) (stored, for e.g., in the VATT) is used by the processor and/or cache controller to indicate a data reference size, specific data transfer busses or other information indicating data reference characteristics. Upon receipt of an access request which includes this hint information, the memory controller schedules accesses to the memory to maximize throughput and enable the appropriate error encoding or decoding circuitry for the data transfer(s).

Figure 6:
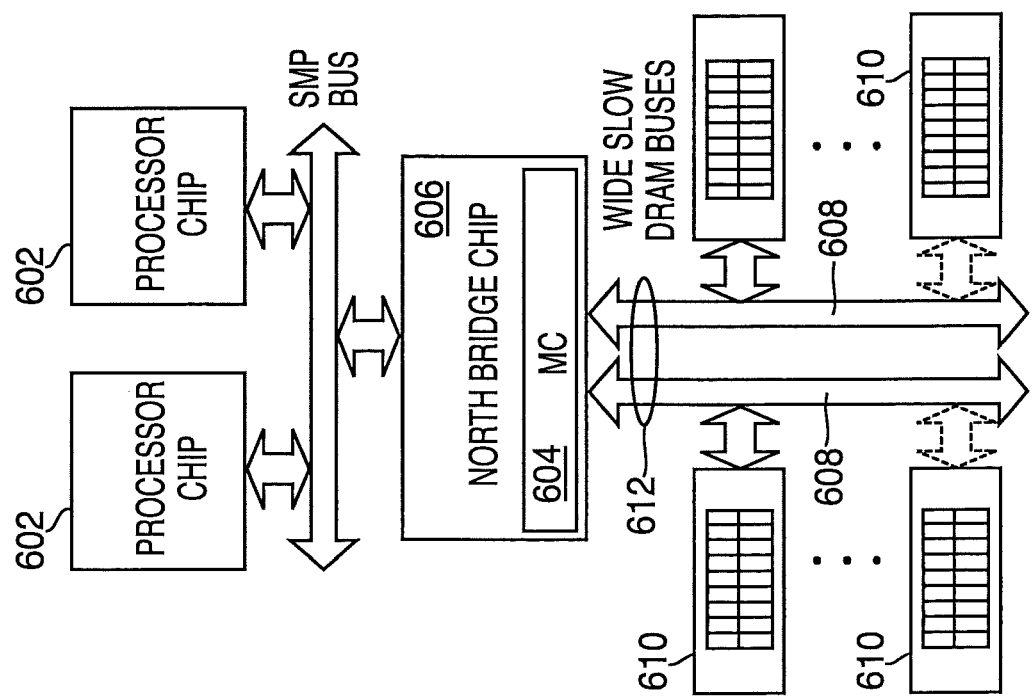
FIG. 6 depicts a block diagram of a computer memory system which includes multiple independent multi-drop memory interface busses that operate in unison to support a single data access request.

In the configuration depicted in FIG. 6, multiple independent multi-drop memory interface busses may be logically aggregated together to operate in unison to support a single independent access request at a higher bandwidth with data and error detection/correction information distributed or "striped" across the parallel busses and associated devices. FIG. 6 depicts a system composed of two processors 602 which share a common memory controller 604, which is integrated into a "North Bridge Chip" 606. The memory controller 604 has two memory interface channels, each including one of the two memory busses 608, with each bus 608 connected to one or more memory subsystems 610 via a multi-drop net structure. As shown by the oval 612 linking the two memory busses 608, when both busses 608 are populated with one or more memory subsystems 610, the memory controller 604 may logically aggregate the two (or more) memory channels and associated busses 608 into a single logical bus such that the physical busses operate in unison to support a single access request. In alternate embodiments, the two or more busses 608 may operate as independent busses. Some systems further enable operation when a subset of the memory busses 608 are populated with memory subsystems 610. In this case, the one or more populated memory busses 608 may operate in unison to support a single access request, or operate independently to support unique memory access requests.

Figure 1:
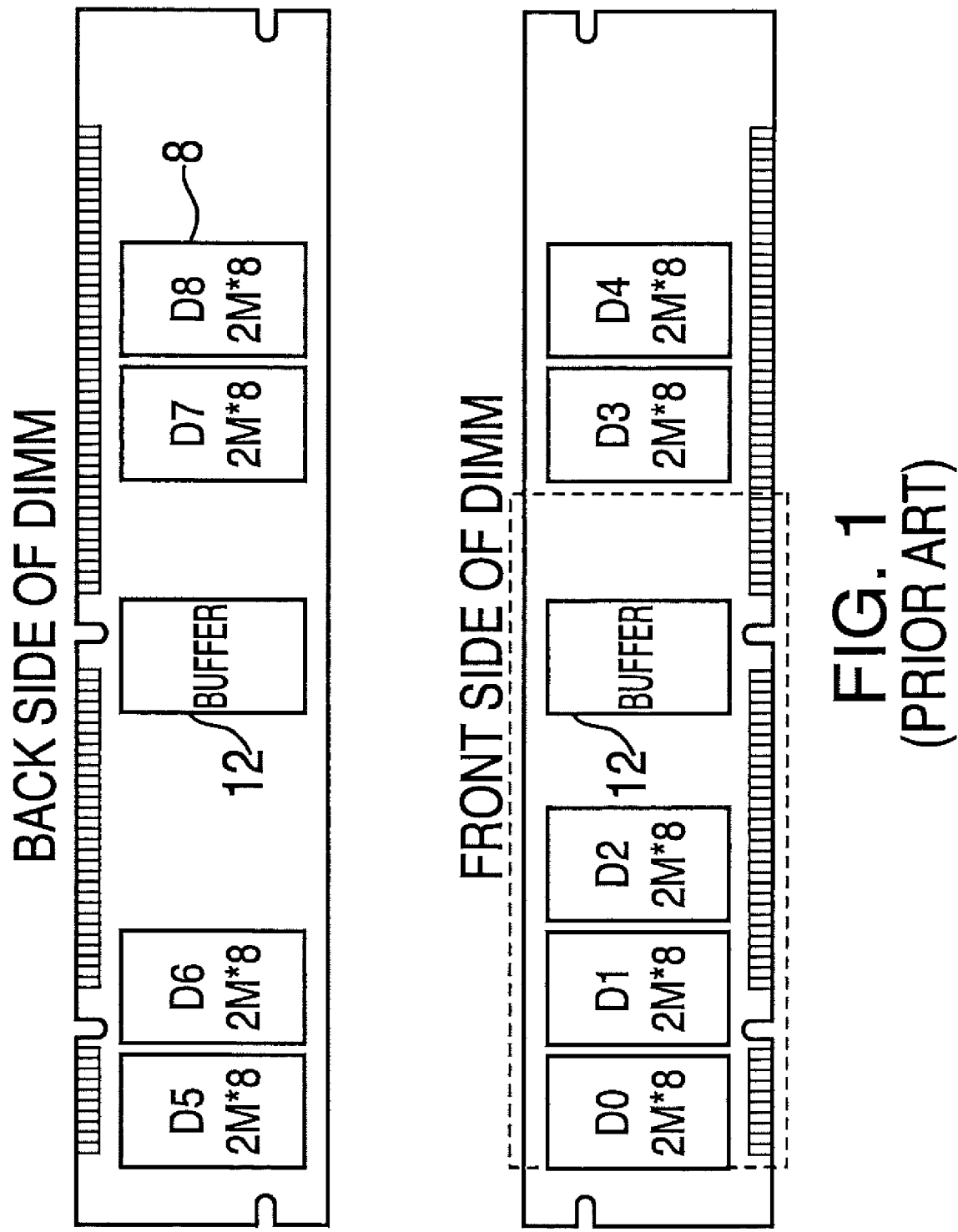
FIG. 1 depicts an exemplary early synchronous memory module.
Figure 2:
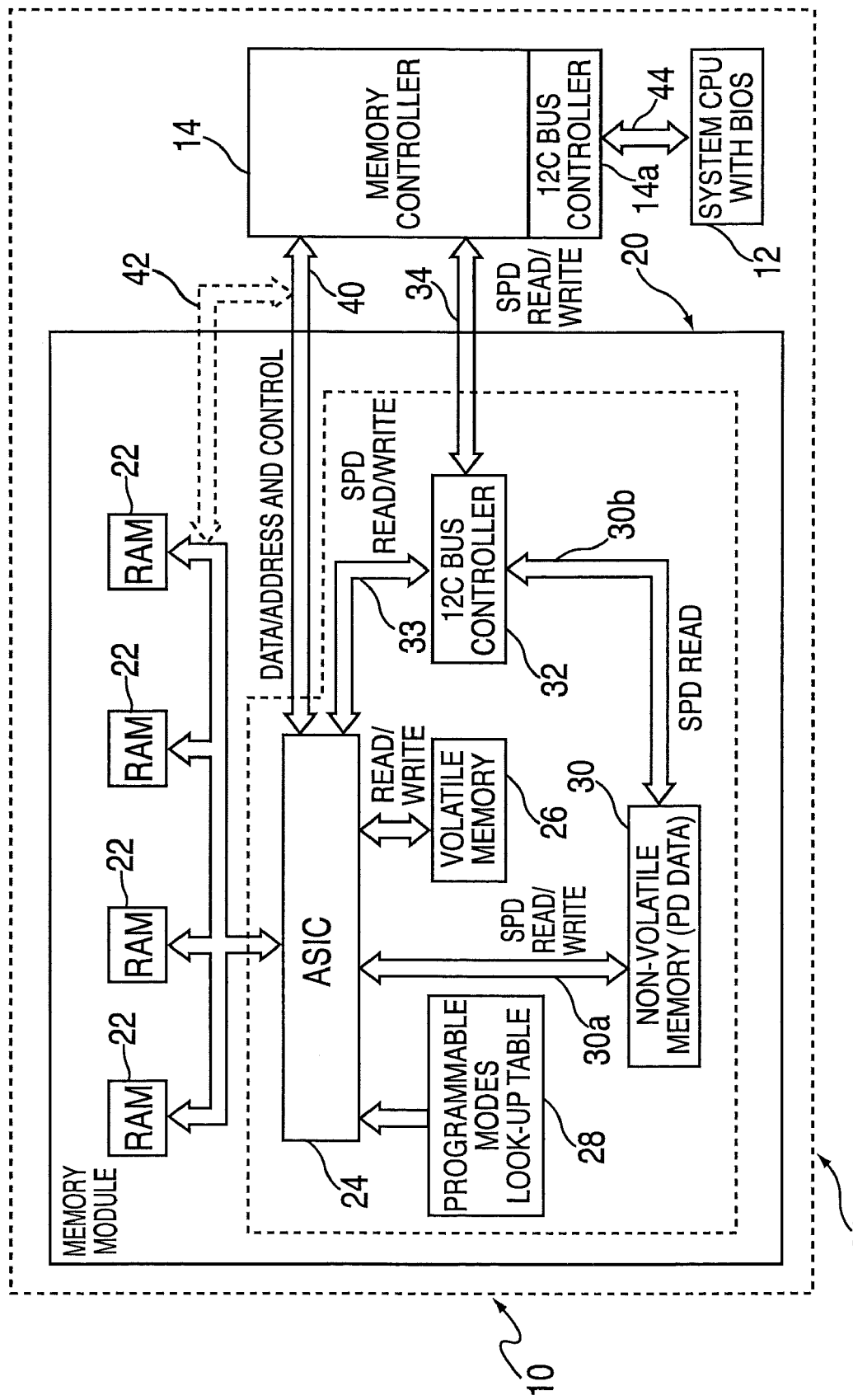
FIG. 2 depicts an exemplary computer system with a synchronous memory module that is directly connected to a memory controller.
Figure 3:
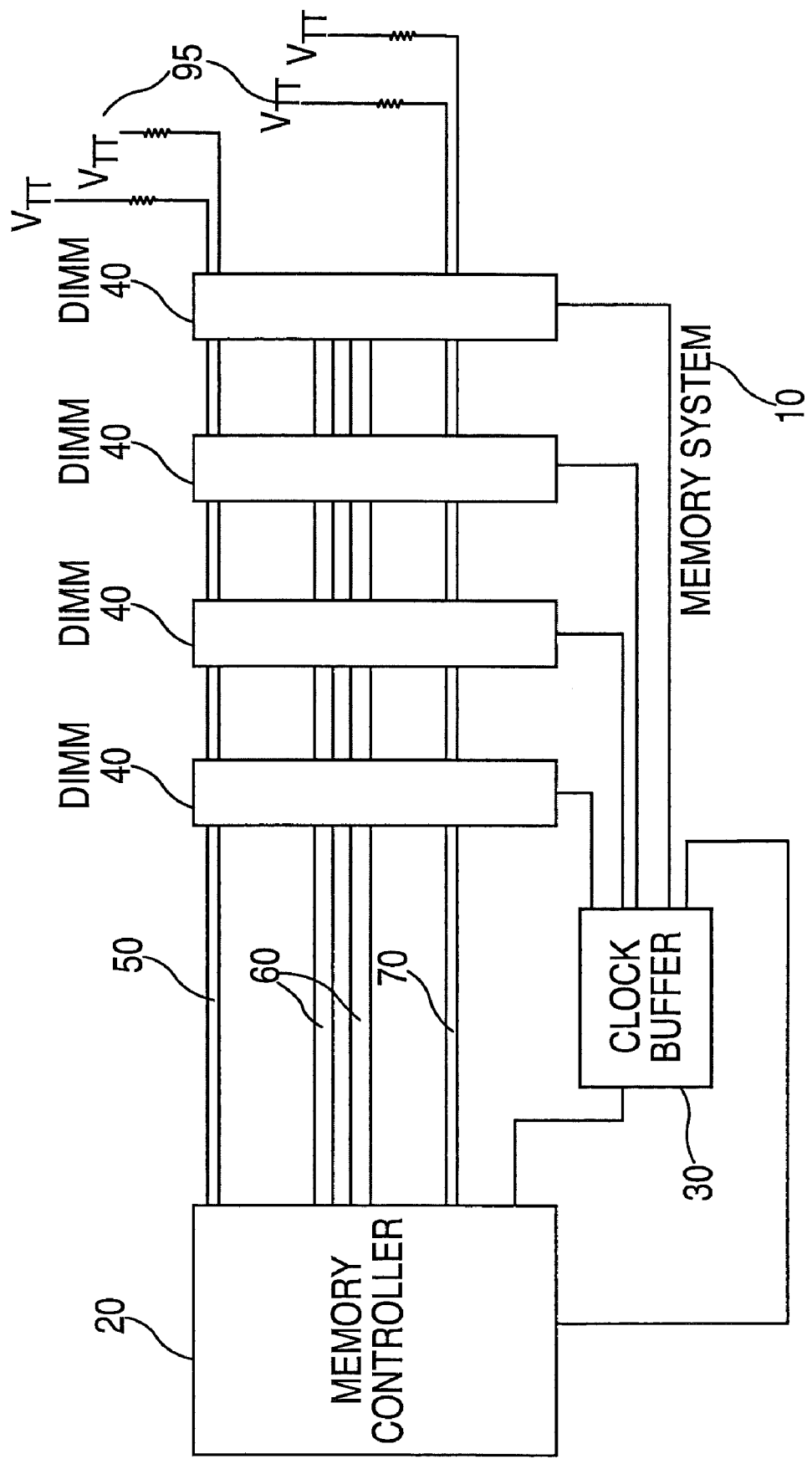
FIG. 3 depicts an exemplary memory system with a traditional multi-drop stub bus channel.
Figure 4:
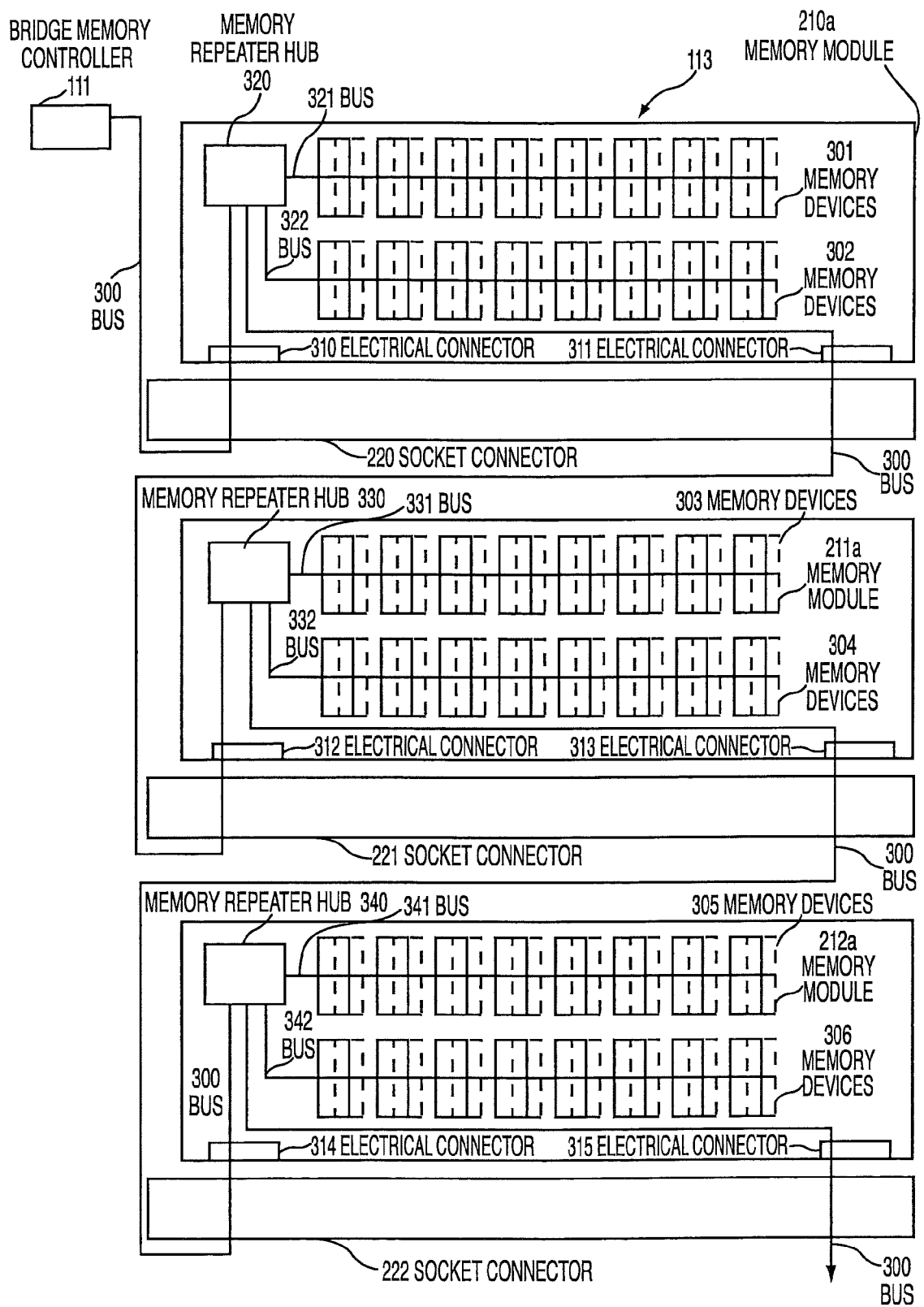
FIG. 4 depicts a synchronous memory module and system structure which includes a point-to-point bus with bus repeaters.
Figure 5:
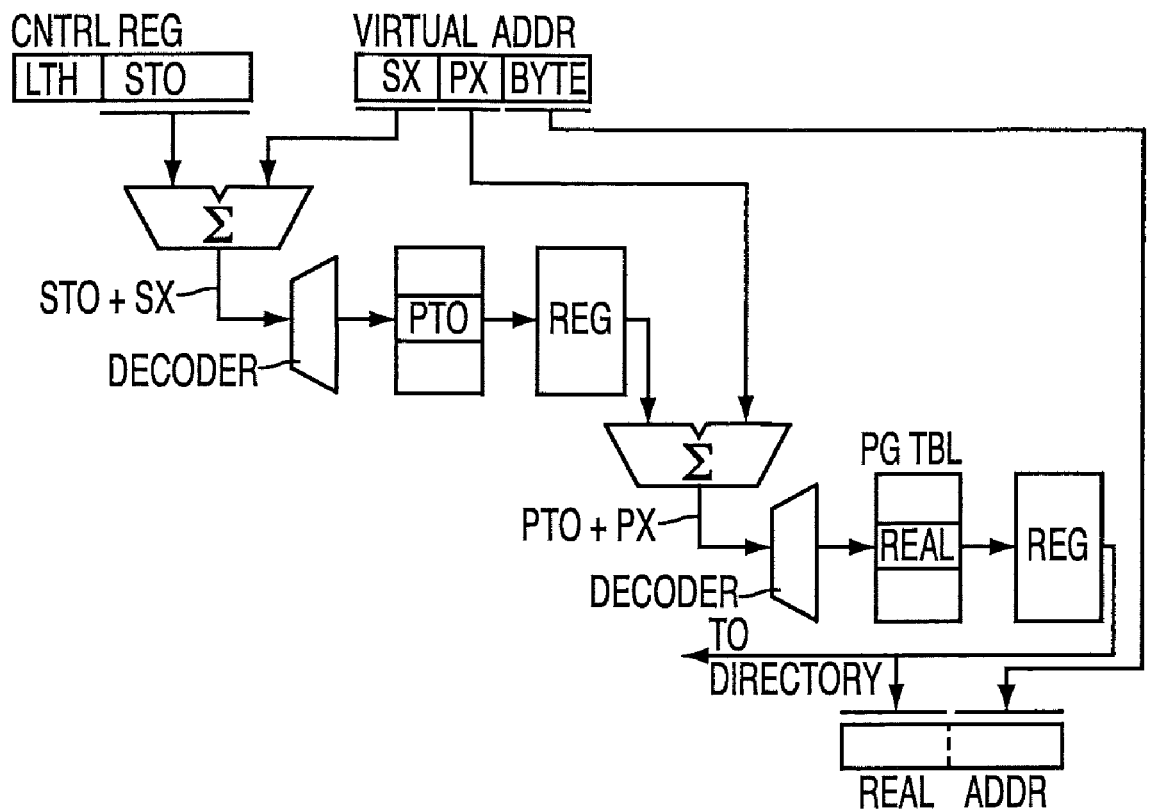
FIG. 5 depicts a block diagram of a translation process from a virtual address to a real address.
Figure 7:
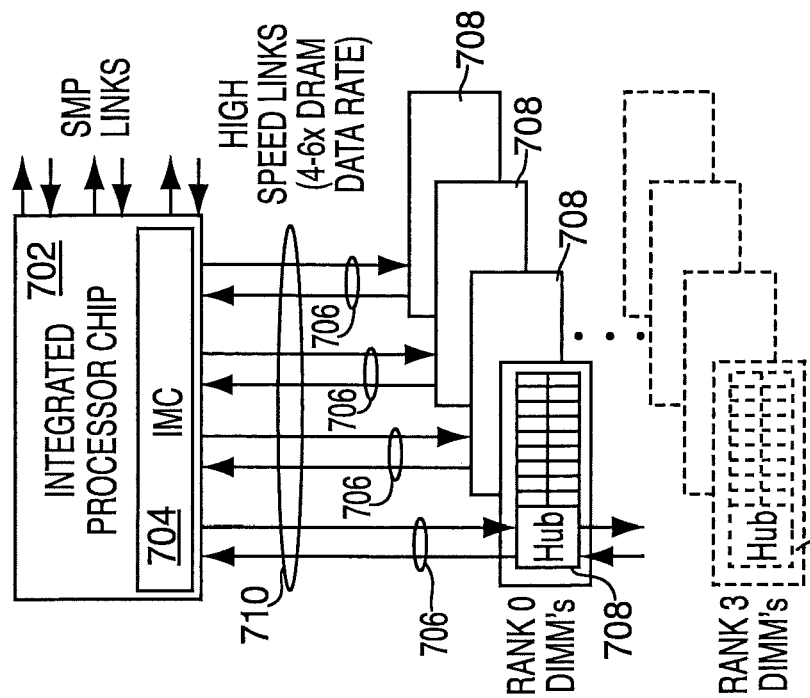
FIG. 7 depicts a block diagram of a computer memory system which includes multiple independent cascade interconnect memory interface busses that operate in unison to support a single data access request.

FIG. 7 depicts a contemporary system composed of an integrated processor 702, which contains one or more processor elements and an integrated memory controller 704. In the configuration depicted in FIG. 7, multiple independent cascade interconnect memory interface busses 706 are logically aggregated together to operate in unison to support a single independent access request at a higher bandwidth with data and error detection/correction information distributed or "striped" across the parallel busses and associated devices. The memory controller 704 attaches to four narrow/high speed point-to-point memory busses 706, with each bus 706 connecting one of the several unique memory controller interface channels to a cascade interconnected memory subsystem 708 (or memory module) which includes at least a hub device and one or more memory devices. As indicated by the oval 710 encompassing the four memory busses 706, the operation is fundamentally identical to that of FIG. 6, although this structure includes a larger number of busses 706 in part due to the number of pins made available for this purpose resulting from the use of the narrow/high speed busses (links) 706. The system structures shown in FIGS. 6 and 7 share a similar memory channel interface pincount, however optimal bus designs using the structure shown in FIG. 7 can offer significantly improved memory bandwidth to the memory controller and processor(s) due to the parallel operation of the four memory busses as compared to the two busses shown in FIG. 6.

As further shown in FIG. 7, computer system memory controllers may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed busses to connect to one or more hub chips and/or memory devices. In any case, data access is limited to one or two policies as determined by the system configuration, generally cache line fetch size with critical data first, but otherwise contiguous.

Computer memory systems are typically comprised of one or more independent memory channels, with each of the one or more memory channels comprising the interface logic, the memory bus(ses) and the memory subsystems (e.g. memory modules) associated with the minimum data width with which the system can operate (e.g. 64 or 72 bits). Each channel includes one or more memory busses or links which interconnect one or more memory controller(s) to one or more memory devices, such that the controller directs requests for access to and from the memory via the appropriate bus(ses) to satisfy the requests. As used herein, the term "bus" refers to a high speed conductive or optical fiber subsystem that provides a path between a processor/computer and control units and/or buffers associated with peripheral, memory or other devices. A "channel" comprises everything associated with the interface between, for example, a memory controller and a memory module, including one or more busses. A data bus, address bus and control signals, despite their names, constitute a single bus since each is useless without the others. A bus may include a plurality of signal lines, where each signal line has two or more connection points that form a main transmission path that electrically connects two or more transceivers, transmitters, and/or receivers.

Figure 8:
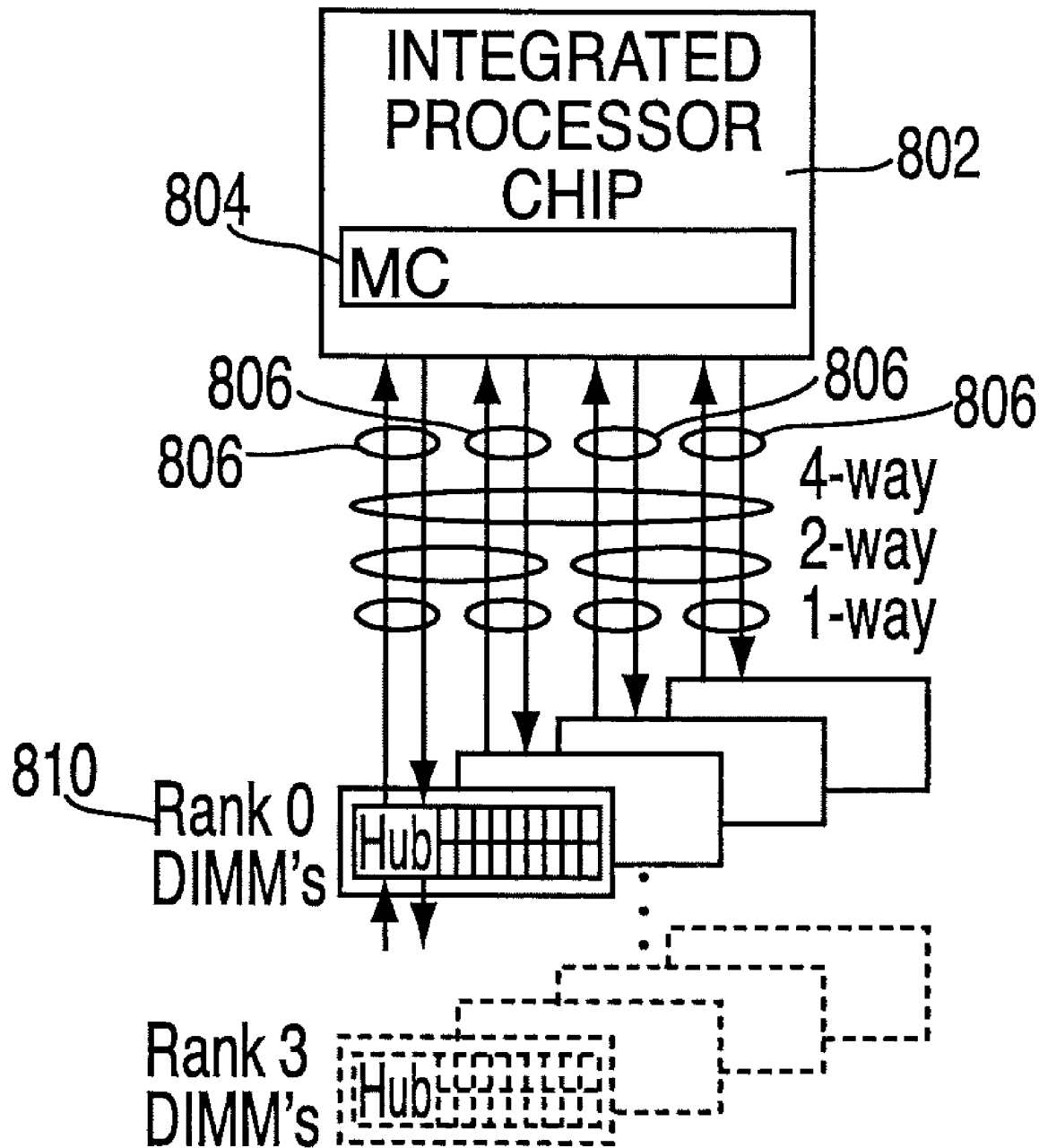
FIG. 8 depicts a block diagram of a computer memory system which includes multiple independent memory interface busses that dynamically switch between operating in unison and operating in parallel (to support multiple data access requests)

FIG. 8 depicts an exemplary memory subsystem that may be implemented by exemplary embodiments of the present invention to dynamically shift between two or more memory channel (and thereby bus), utilization patterns. In the configuration depicted in FIG. 8, a subset of the available independent memory interface busses are logically aggregated together to operate in unison. The memory subsystem includes an integrated processor chip 802 with an embedded memory controller 804. The memory controller 804 is in communication with the one or more memory modules 810 (in this case DIMMs) via point-to-point busses (or links) 806 that include upstream bus(ses) used to send information (e.g., data, status, error correction codes and error flags) from the memory modules 810 to the memory controller 804 and downstream bus(ses) that send information from the memory controller 804 to the memory modules 810. In the example depicted in FIG. 8, the memory modules 810 are organized into one or more physical groups, as depicted by the ovals linking groups of one, two, four or other busses, with each physical group enabling parallel access, on a clock-by-clock basis, to the one or more memory modules 810 attached to the busses 806.

Memory modules 810 include one or more hub devices 812 which convert the information on the narrow/high speed bus 806 to the appropriate format (command sequence(s), address(es), timings, levels and other attributes) required to enable operation of the selected memory technology. The one or more memory devices 814 (e.g., DRAMs) may be organized as one or more memory 'ranks', with each rank comprised of the one or more memory devices 814 involved in a single write or read operation (e.g. a 72 bit data width comprised of nine memory devices each having an 8 bit interface).

As depicted in FIG. 8, the memory controller 804 receives and responds to memory access requests from the processor and/or cache controller circuitry resulting from an application on the integrated processor chip 802. In general, the memory access requests begin as a virtual address. In exemplary embodiments, write memory access requests include "hint" information which will result in VATT entry(ies) associated with the integrated processor chip 802 including information related to the one or more memory channel(s) and associated error detection and/or correction circuitry to be used for both the write and read operations for the specified real address range. This hint information is utilized by the memory controller 804 to determine the appropriate memory busses 806 and associated error detection and/or correction circuitry to be used for the write operation. For example, the application information may be utilized to determine that only a single (i.e: one-way interleave) bus 806 is required to store the data on a given module 810. Alternatively, the application information may be utilized to determine that two (two-way interleave) or four (four-way interleave) busses 806 are required to store the data on the targeted memory module(s) 810. All, or a subset of the busses 806 may be required to store the data on the memory modules 810, and the number and location of memory modules 810 may change from one memory access request to another.

The number four is just an exemplary number of busses 806 and any number of busses 806 connected to memory modules 810 may be available to the memory controller 804. One or more of the busses 806 may be utilized by embodiments of the present invention to respond to each of the memory access requests. Which bus(ses) 806 is required for a particular write operation is determined based on the memory access request and the hint information associated with the memory access request. The number of required busses 806 may vary from one memory access request to another. In addition, more than one memory request may be serviced concurrently (in the same cycle) as long as the concurrent or overlapping accesses don't require access to the same busses 806. As described later herein, the information indicating what bus(ses) 806 are required to access the requested data is stored along with the real address of the data, in the VATT.

In exemplary embodiments, computer software programs specify expected retrieval requirements to indicate how the data should be organized and referenced within the main memory. Access hints are determined from the expected retrieval requirements and these access hints are conveyed to the operating system software when the application requests memory resources for data storage from the operating system software. The application retrieval requirements may be specified in the software at the source code level, or in compilation library software modules or the compiler may introduce them autonomously. In exemplary embodiments, when the application is compiled or written, memory allocation constructs (like malloc for the C language) convey what the preferred access granularity should be (say, full, half or quarter cache line), and this information is stored as an access hint, or hint state, by the operating system associated with the real address range established for the memory allocation. Compiling the application for computer systems that do not support this invention will not include the retrieval requirements in the executable program code and data access will be performed without the benefit of the access hint (i.e., the way that is currently performed). In this manner, both new applications that specifying retrieval requirements and existing applications that do not specify retrieval requirements can be serviced by the same memory controller and the same memory devices.

Memory data organization "hint" information may be defined directly in the memory controller via programmable hardware register state, and/or by programmable hardware register address range registers, such that memory access request addresses are compared to the programmed range registers to determine when and which hint attribute, if any, applies to a request to access the memory. Further, a hint may be encoded in processor instructions, such that certain instruction variants are used to suggest that data be accessed in a manner specific to the instruction.

In exemplary embodiments, the hint information is associated to the real address by storing the access hint, or hint state, in a VATT page entry that is established by the operating system to allocate a memory resource, upon request, to a software application. When the application program references memory, it does so with a virtual address, and that is used to select, via the VATT, a real address (ultimately corresponding to a physical location on one or more memory devices) supported by the memory controller in the physical memory. The VATT contains an entry for each block or "page" of virtual memory addresses, and these entries maintain the association of the virtual address to the real address, and contain various attributes for the page. Exemplary embodiments expand the supported attributes in page table entries to include an access hint, or hint state, to indicate data organization. Moreover, data may be accessed by a subset or all of the memory channels via independent page table entries that are mapped to all or portions of the same real address range (see FIG. 11 and accompanying description). Input/output (I/O) adapter hardware may also incorporate address translation registers, generally maintained by software. These registers include equivalent page data organization hint states that are conveyed to the memory controller with requests to access the memory. In either case, the hint state is reflected in the memory request to the memory controller on special signals, along with the real address and other conventional attributes.

The memory "hints" can affect memory accesses in numerous manners. In exemplary embodiments, the hints are used for selecting a single memory channel (and therefore selecting the busses associated with the channel) or a combination of two or more memory channels; defining optimal access patterns for non-sequential, non-contiguous, and abridged data for non-cacheable and/or sparse data; as well as defining a "clear" to indicate page clearing after a page is released back to the operating system by the application. Exemplary memory systems employ memory hub devices between the memory controller and the DRAM devices. Memory request hints are used to control the "memory interleave" or the number of independent memory busses and associated memory subsystems that are used to service a single request, as well as what error correction encode and decode circuits are to be used to support the ECC for the desired interleave.

Virtual memory addresses may be mapped across multiple memory channels and associated hub and memory devices in a variety of manners. For example, addresses may be hashed to distribute data to best facilitate optimal memory reference sizes and distribution patterns. In exemplary embodiments, optimal cache line referencing is enabled as well as short or abridged references to parts of the cache line. This facilitates maximum throughput and minimum latency when referencing the same region by cache line or by sub-cache line. For example, where four channels service a one hundred twenty-eight byte cache line, each channel provides thirty-two bytes, so the same data may be referenced as two channels with a sixty-four byte reference or with one channel with a thirty-two byte or smaller reference. References to parts of a cache line are indicated by data lane enables, and are transmitted to the memory controller with the access request and as well as back to the requester with the reply data. Data lane enables are implementation dependent for read reply data, as the requester can retain the request enables, to avoid having to retransmit them with the reply.

In exemplary embodiments, the memory controller employs error correction code (ECC) circuits to generate and check the ECC for data being written to and read from the one or more memory devices. These circuits are selected based on the access "interleave" (number of participating memory channels), such that a four-way interleave requires data and ECC redundant bits be distributed across four channels, or as two or four ECC code words accessed in parallel but processed independently. Interleave ECC may be processed either by the memory controller or within the hub chip itself, such that write data ECC may be generated by the memory controller or by the ECC circuits in the hub chip before data is propagated to the DRAM.

Figure 9:
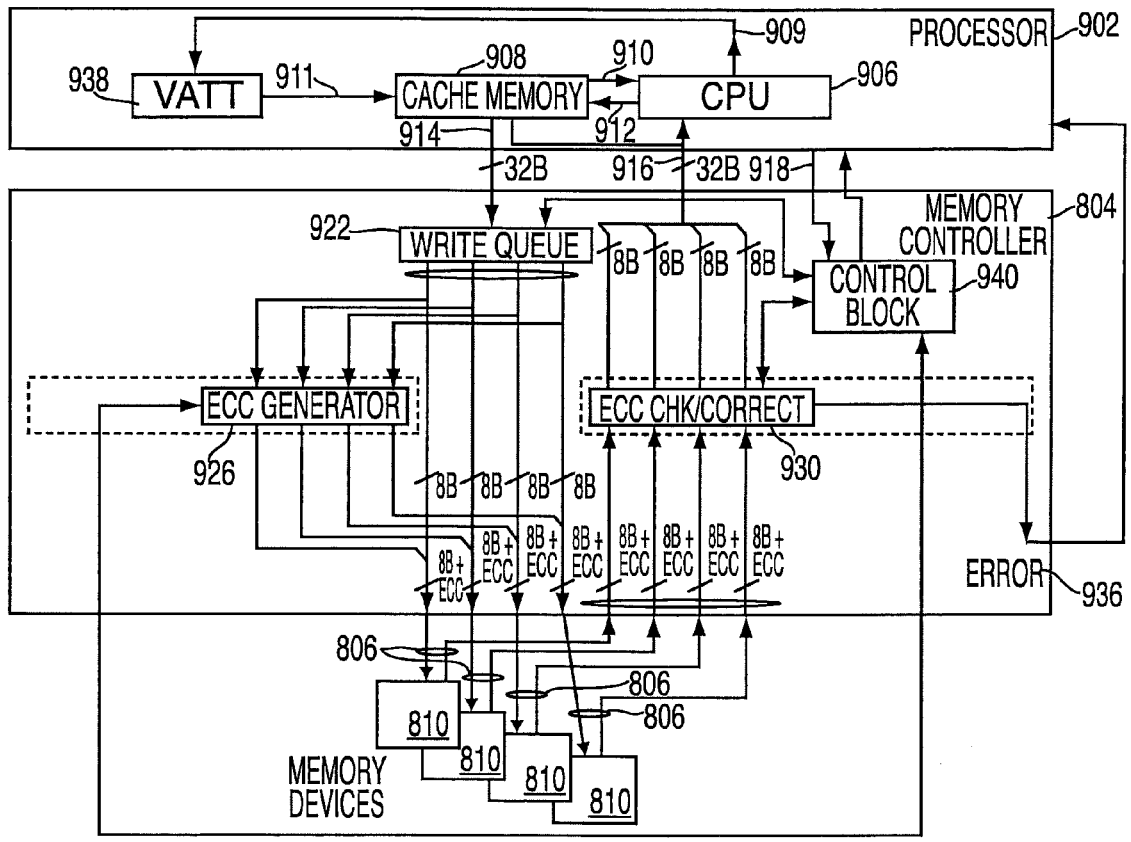
FIG. 9 depicts a simplified data flow associated with the memory structure shown in FIG. 7.

FIG. 9 depicts an exemplary data path circuit for responding to a memory access request that utilizes four channels including ECC circuitry for distributing ECC bits across the four busses 806. FIG. 9 depicts a processor 902 that initiates memory access requests to a memory controller 804. The processor 902 includes a local cache memory 908, a VATT 938 and one or more central processing units (CPUs) 906. The local cache memory 908 transfers data to the CPU 906 via a communication data link 910 and the CPU 906 transfers requests for data to the local cache memory 908 via a communication data link 912. The CPU 906 passes access requests to the VATT 938 via address/command link 910, and the VATT maps the virtual address access request to a 'real' address, which is passed to cache memory 908 via link 911, and may further be passed to the memory controller, in conjunction with command, priority and related information in parallel with the transfer to the cache, upon determination that the cache does not include the real address range associated with the CPU request, or via an alternate cache access algorithm.

In response to direction from the processor 902, data information 914 and address, command, and associated information 918 is transmitted to the memory controller, which in combination communicate an operation such as a memory access request to write data to a write queue 922 in the memory controller 804. Control block 940 decodes the address, command and associated information from the processor and selects and configures the write queue and ECC generator circuitry during write operations and ECC check/correct circuitry during read operations. Errors identified during data transfer and/or ECC operations are reported to control block 940 and/or error lines 936 for error recovery and communication to processor 902, depending on the system design. Although not shown, additional circuitry in the memory controller, such as bus transceivers, configuration registers, timing control circuitry, self-test circuitry, etc. also participate in the memory interface operation, but are not shown as these functions are widely practiced in the art. In the exemplary embodiment depicted in FIG. 9, there are four interface busses 806 each including a sending bus and a receiving bus. The ECC generator 926, depending on the ECC structure used (e.g. 64/72, 128/144, etc) generates the one or more ECC code(s) associated with data being written, with the combined data and ECC information applied across all four busses 806. The ECC code (e.g., 8 bits for each 64 bits of data) is distributed or striped across the four busses 806 (in this example, across thirty-two bytes) and transmitted to the memory device(s) located on memory modules 810 via the busses 806. In the example circuitry depicted in FIG. 9, each bus 806 receives eight bytes of data and control information and up to one byte of the ECC code.

As depicted in FIG. 9, memory access requests to read data are received from the processor 902 by the memory controller 804. The read requests include at least a single real address provided from the VATT 938 that correlates to the requested data. The memory controller 804 retrieves the data from the memory devices located on the module(s) 810 via the four busses 806. In the exemplary embodiment depicted in FIG. 9, all four of the busses 806 are utilized to receive data (thirty-two bytes) and an ECC code (up to four bytes) from the memory devices 810. The ECC checking and correction circuit 930 performs ECC processing on all four busses 806. If an error is found by the ECC checking and correcting circuitry 930, then an error message 936 is transmitted to the processor 902, via control block 940 to the processor 902 or alternately to a service processor, I/O or other device associated with error reporting and interpretation/response. In alternate exemplary embodiments, any or all of the write requests are implemented as read-modify-write requests.

Figure 10:
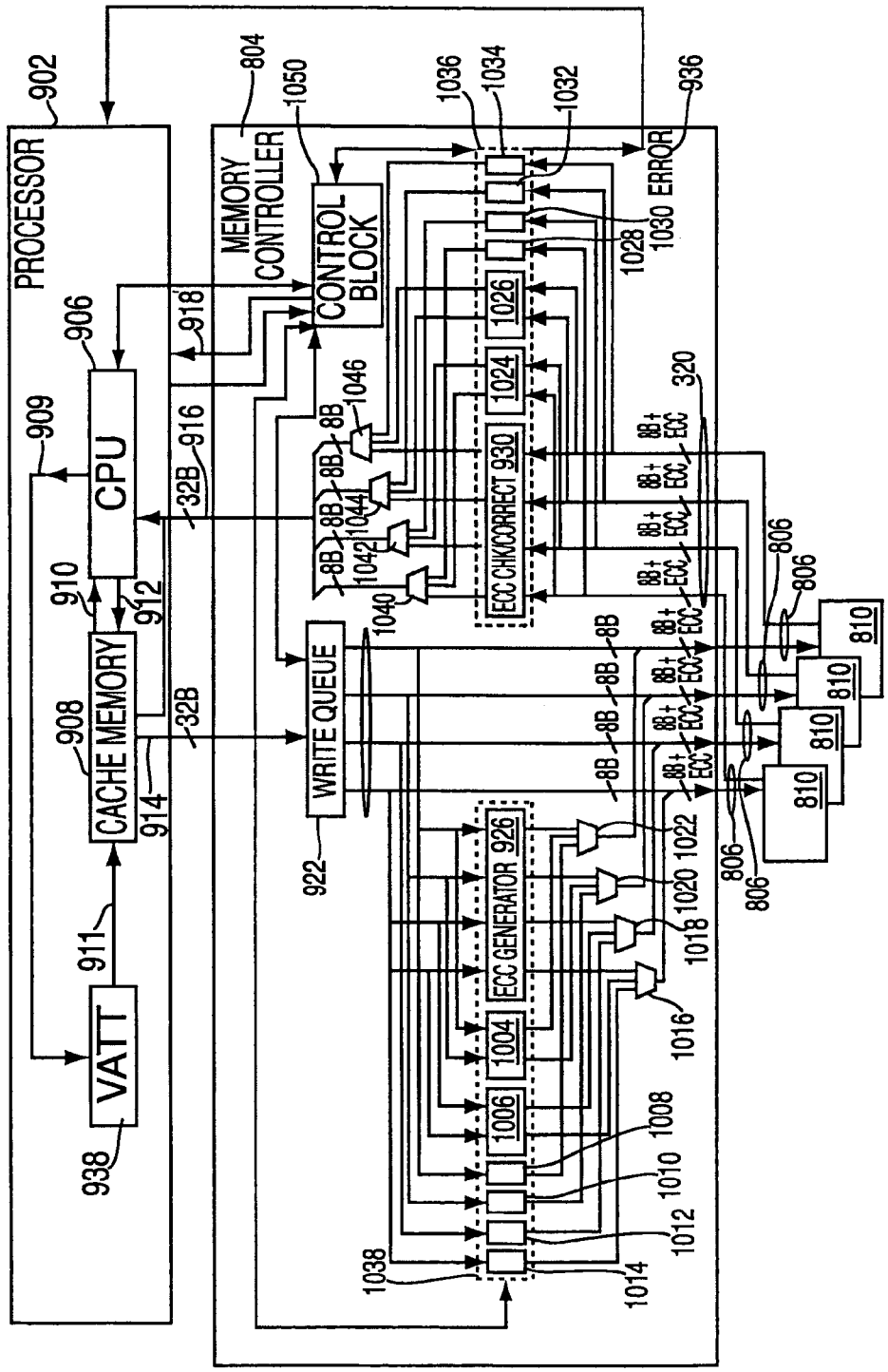
FIG. 10 depicts a simplified data flow associated with the memory structure shown in FIG. 8.

FIG. 10 depicts exemplary circuitry for responding to a memory access request by dynamically determining the busses and other functional units utilized to complete the request. In addition, FIG. 10 depicts exemplary ECC circuitry where the ECC bits are distributed across one, two or four interface busses 806 depending on the requirements of the memory access request. The circuitry depicted in FIG. 10 is similar to the circuitry depicted in FIG. 9 except that only the busses 806 required by the current memory access are utilized and that ECC codes are generated and checked only for the busses 806 being utilized by the current memory access request. Control block 1050 decodes the address, command and associated information from the processor and selects and configures the write queue and ECC generator circuitry 926, 1004, 1006, 1008, 1010, 1012 and/or 1014 during write operations and ECC check/correct circuitry 930, 1024, 1026, 1028, 1030, 1032 and/or 1034 during read operations. Errors identified during data transfer and/or ECC operations are reported to control block 1050 and/or error lines 936 for error recovery and communication to processor 902, depending on the system design. Although not shown, additional circuitry in the memory controller, such as bus transceivers, configuration registers, timing control circuitry, self-test circuitry, etc. also participate in the memory interface operation, but are not shown as these functions are widely practiced in the art. In addition, the VATT 938 in FIG. 10 includes the addition of 'hint' information which is passed to the memory controller, in conjunction with the "real" address, via processor signals 918. The VATT 938 is utilized to store hint information about the busses 806 and ECC circuitry being utilized by the current memory access request. The VATT 938 may be a separate element from the processor 902, or it may be contained within the processor 902 as depicted in FIG. 10.

In exemplary embodiments, if a write operation is being performed and it only utilizes the first two busses 806, then the ECC codes generated by ECC generator 1006 will be written to the memory modules 810 via the first two busses 806. The writing of the associated ECC codes and data is controlled by the memory controller 804 in response to the hint information stored in the VATT 938, by selecting the ECC information from multiplexer 1016 and multiplexer 1018, which is then appended to the data being written to the first two busses 806. In this manner, and depending on the selected ECC generator circuitry, two one-byte or one two-byte ECC code(s) is created and stored with the sixteen bytes of data being written in response to the memory access request. If an error is found by the ECC checking and correcting circuitry 1036 during a subsequent read, then an error message 936 is reported to the processor (and/or other error processing circuitry) indicating at least the failing bus(ses) 806 is transmitted to the processor 902.

A similar process occurs when data is read from a subset of the busses 806. Only the valid data (based on hint information about the associated busses 806 stored in the VATT 938) are transmitted to the processor 902 in response to a memory access request that includes a read request. One or more control signal(s) to the applicable multiplexer(s) is created, by the memory controller, based on the hint information, to select the valid output data path through the ECC check/correction logic 930, 1024, 1026, 1028, 1030, 1032, and/or 1034 and multiplexer 1040, 1042, 1044 and/or 1046 based on the information stored in the VATT 938 and decoded by control block 1050.

In response to a request to the memory controller 804 to retrieve or store data with an indication of "1-way interleave" or a "2-way interleave", the memory controller 804 initiates an access to the requested physical address to select which bus(ses) 806 is required to access the memory device(s) on memory module(s) 810 with the requested data. Other busses 806 remain unaffected and available for the memory controller 804 to initiate other requests concurrently. For example, in a four channel memory system, during the same clock cycle, the first bus 806 may be processing a first memory access request, the second bus 806 may be processing a second memory access request and the third and fourth busses 806 may be processing a third memory access request.

For write requests, the memory controller 804 directs the valid data to the ECC generation circuit(s) (926, 1004, 1006, 1008, 1010, 1012 and/or 1014) based on the hint information provided the memory controller 804 by the processor 902 (in response to the information stored in the VATT 938) to generate the ECC check bits, and then the combined data/check bits (ECC word) are directed to the selected memory interface bus(ses) where the $1^{st}$ memory module(s) receives the information, re-drives or by-passes the information to the next memory module and/or interprets the information (in the hub chip) to determine the required action. In the simplest embodiment, once the hub chip determines that the bus information is related to a write operation to that memory module, the hub generates the command, address and timing sequences required to complete the write operation to the memory devices. In alternate embodiments, the write operation may be postponed due to higher priority operations in-process or scheduled on the memory module, with the write request and associated address and data temporarily stored in a write buffer for later execution. Additional functions that may reside local to the memory subsystem, generally within the hub chip, include one or more levels of local memory cache, data encryption/decryption, data compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other subsystems.

For read requests, in the simplest embodiment, the selected memory hub chip(s) services the read request from the memory controller 804 by reading data from the DRAM devices 814 and forwarding the resulting ECC word(s), often received from the memory devices in a burst of 4 or 8 transfers, to the memory controller 804 via the memory bus(ses) 806. The memory controller 804 receives the expected read data from the one or more memory busses 806 and directs the ECC word(s) to the ECC circuits 930, 1024, 1026, 1028, 1030, 1032 and/or 1034 to check for errors that may be present in the data and correct data (if required) before transferring the validated data to the requester on the data reply bus with associated attributes. Based on the hint information associated with the read request, the multiplex circuitry 1040, 1042, 1044 and 1046 will select the outputs from the appropriate one or more ECC check/correction circuits involved in the read operation. In addition, this hint information will further enable the correct one or more ECC check/correction circuits via the control block 1050, such that the ECC check/correction circuits not involved in the read operation are available for use by other simultaneous operations, placed in a lower power state or otherwise unused.

The circuitry depicted in FIG. 10 represents a logical view of the processing to be performed by the ECC logic. In exemplary embodiments, the physical implementation (i.e., the physical XOR gates) will be different (e.g., several of the physical XOR gates may be shared across two or more of the ECC check/correction circuit blocks if parallel operations are not supported, or in a manner that does not impede parallel operations). Any physical implementation (hardware and/or software) that supports the logic circuitry depicted in FIG. 10 where the access hint, or hint state, associated with a memory access request dynamically selects the busses 806 and the appropriate ECC mode utilized for one or more read or write operations may be implemented by exemplary embodiments.

Figure 11A:
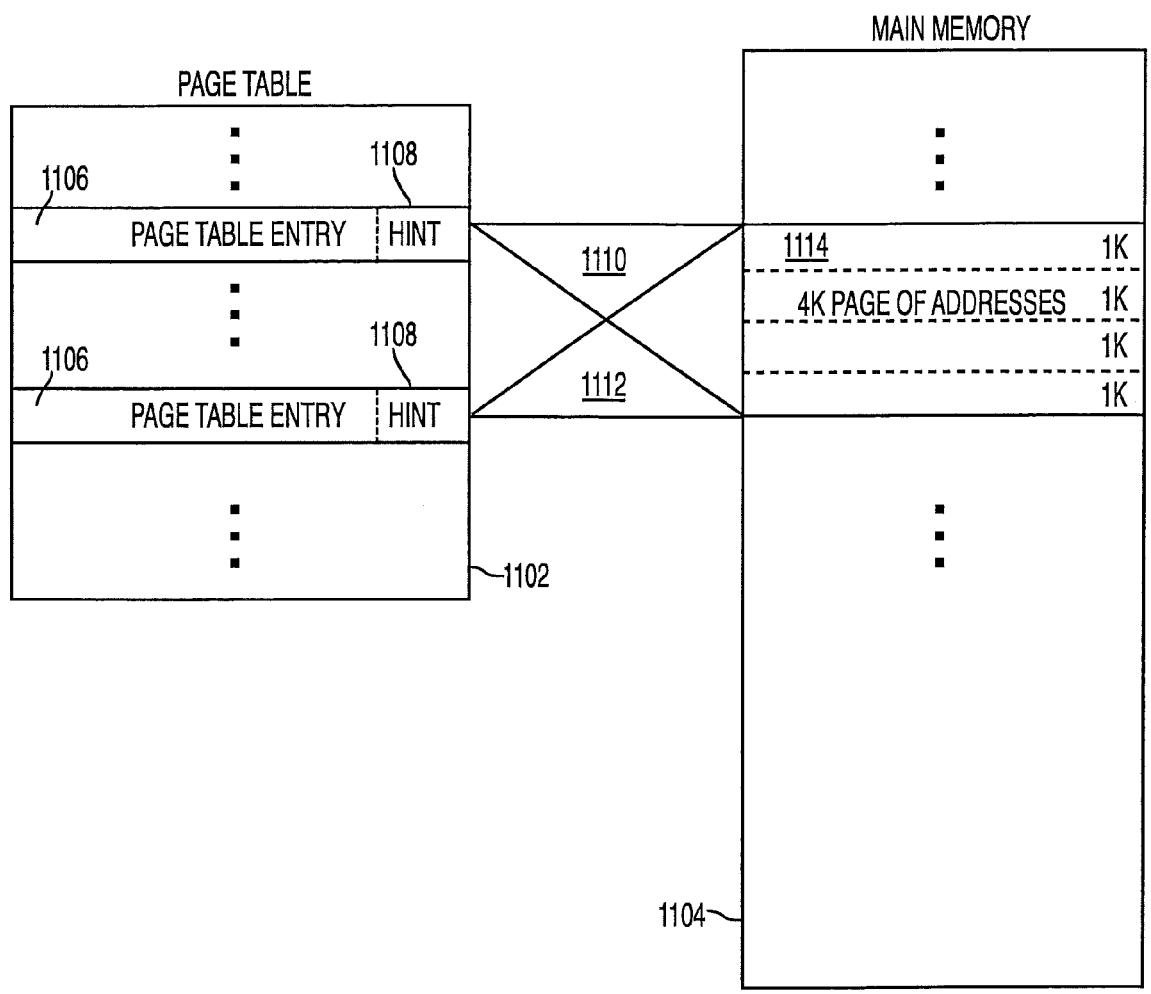
FIGS. 11a-c depict exemplary real to physical address mappings that may be implemented by exemplary embodiments based on hint data stored in a virtual address translation table (VATT)
Figure 11B:
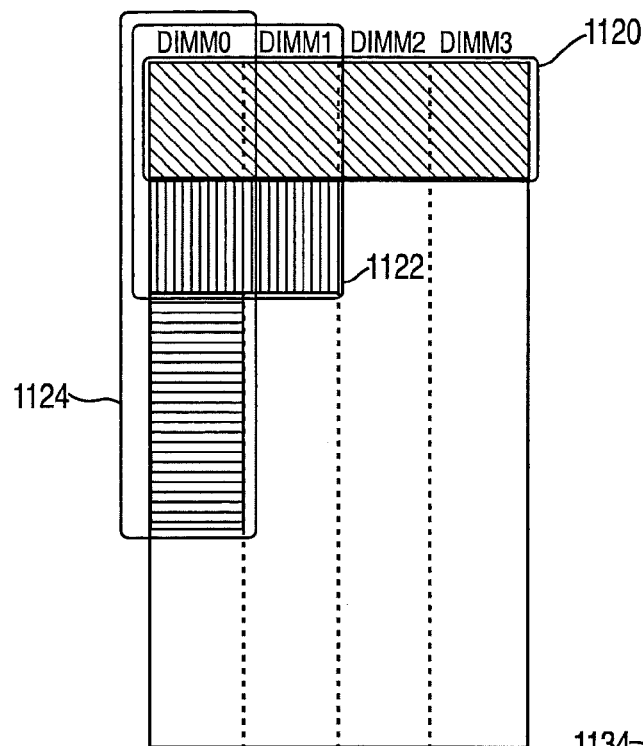
Figure 11C:
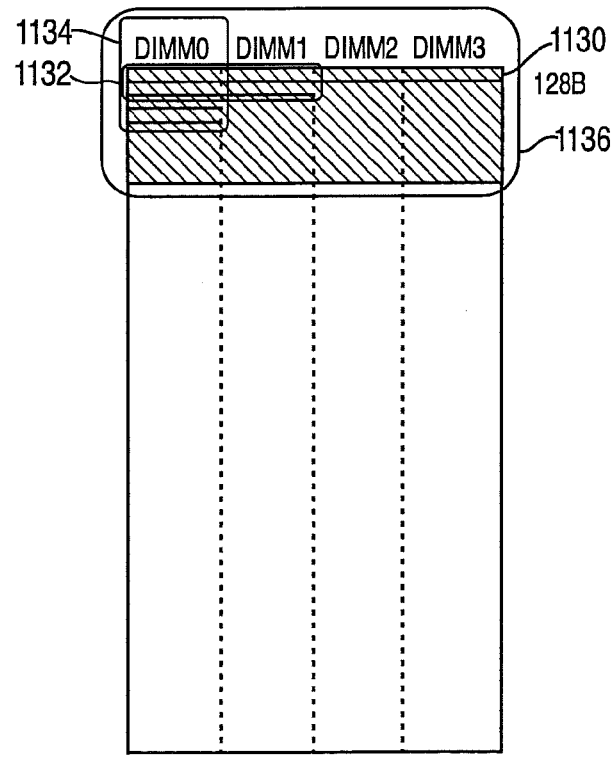

FIGS. 11a-c depict exemplary real to physical address mappings that may be implemented by exemplary embodiments based on hint data stored in a VATT. In exemplary embodiments, the processor 902 (or some other device) initiates an access to memory. The VATT 938 maps the access request to a "real" memory address range. When the data is resident in the local cache memory 908, the real address from the VATT 938 correlates to a real address in the cache memory 908, and the access is completed using the contents of the cache memory 908. If the cache memory 908 does not contain the real address, the memory controller 804 maps the real address to a "physical address" (i.e., a row/column address on one or more memory devices in a memory module 810 in a given memory device technology), and the memory modules 810 provide access to the data on the memory devices. Exemplary embodiments expose the physical mapping to the VATT 938 by way of a data organization hint, such that the system software, via the hints stored in the VATT 938, can control the mapping of real addresses to physical addresses.

FIG. 11a depicts an exemplary VATT 938 that may be utilized by exemplary embodiments to map real addresses to physical addresses based on hint data in the VATT. The VATT 938 includes a page table 1102 that includes page table entries 1106. The page table entries 1106 include a "real" address for the data, which is later converted to a "physical" device address by the memory controller, as well as an access hint 1108 (also referred to as a "hint state" or a "hint") describing how the data is stored in main memory 1104 on the memory module(s) 810. In the exemplary embodiment depicted in FIG. 11a, each page table entry 1106 is associated with a physical 4K page. In exemplary embodiments, the access hint 1108 for the first page table entry 1106 specifies that the data should be retrieved using a single bus (e.g. an eight byte data width), and this results in a 4K page of addresses 1114 in the main memory 1104 being accessed. As described previously, only one bus 806 would need to be utilized to satisfy this memory access request, since the physical page address range was defined as being associated with the memory address range within the memory located on a single bus. As shown in the second page table entry 1106, a second software application may include a virtual address which maps to a real address and access hint, as shown in the second page table entry 1106, which is associated with the same physical address as the first page table entry, as depicted in 1112, which overlaps the same address space 1114 associated with the first page table entry as depicted in 1110.

In exemplary embodiments, the access hint 1108 for an alternate one or more table entries may specify that a 4K page of data should be retrieved using all of the four available busses, with the page 1112 defined as being associated with the memory address range within the memory devices located across all 4 memory busses 806. As described previously, four busses 806 would be utilized to satisfy this memory access request. In further applications, the 4K page may be physically separated (by other intermediate addresses) such that a portion of the physical 4K page resides on one, two or more memory channels (and associated modules), such that the address space may be accessed via one or more accesses, each to one or more memory channels, to permit most efficient use of the memory space based on access priority.

FIG. 11b is an example of a portion of a physical memory address map and three different methods in which a 4K page can be physically addressed based on an access hint 1108 in the VATT 938 using exemplary embodiments. The example depicted in FIG. 11b includes a memory system with one, two or four memory modules 810 (e.g., DIMMs), with each DIMM attached to one of the four memory busses 806. The VATT 938 may include an access hint 1108 to direct the memory controller 804 to access all four memory modules 810 via the four busses 806, with each memory module 810 providing one fourth of the 4K page as shown in the physical address space 1120. With a different access hint 1108, the VATT 938 may direct the memory controller 804 to access two of the four memory modules 810 via a subset of the busses 806, accessing a 4K page as shown in physical address space 1122. Given yet another access hint 1108, the VATT 938 may direct the memory controller to access a 4K page residing on a single memory module 810, as shown in physical address space 1124. As shown by FIG. 11b, independent page table entries may be mapped to a portion of the same physical address range (e.g., the shared physical regions associated with 1120, 1122 and 1124) based on the content of the access hint 1108 in the VATT.

FIG. 11c is an example of a portion of a physical memory address map and three different methods in which a 128 byte cache line access (e.g., a portion of the highlighted 4K page 1136) can be physically addressed based on an access hint 1108 in the VATT 938 using exemplary embodiments. The example depicted in FIG. 11c shows how four memory channels can service a 128 byte cache line access, where each memory module 810 accesses 32 bytes (physical address space 1130). When the VATT access hint 1108 directs the memory controller 804 to access only two of the four memory modules 810 (e.g., DIMM0 and DIMM1), physical address space 1132 consists of two memory modules 810, each accessing 64 bytes. Given a third data organization or access hint 1108, physical address space 1134 would be accessed, on a single DIMM (e.g., DIMM0), with the other memory channels and associated memory modules 810 available to be accessed simultaneously.

The ability to access all or a portion of the same physical memory space in main memory 1104 in different manners may be useful in a variety of applications. One example is when the data is contained in a database or matrix. Certain memory access requests may apply to functions that manipulate row data and therefore access to all four busses 806 would be the most efficient for accessing the data. Other application functions may create memory access requests that manipulate column data and therefore access to a subset of the busses 806 would allow the data to be accessed and would free up the other busses 806 for use by other applications.

Figure 12:
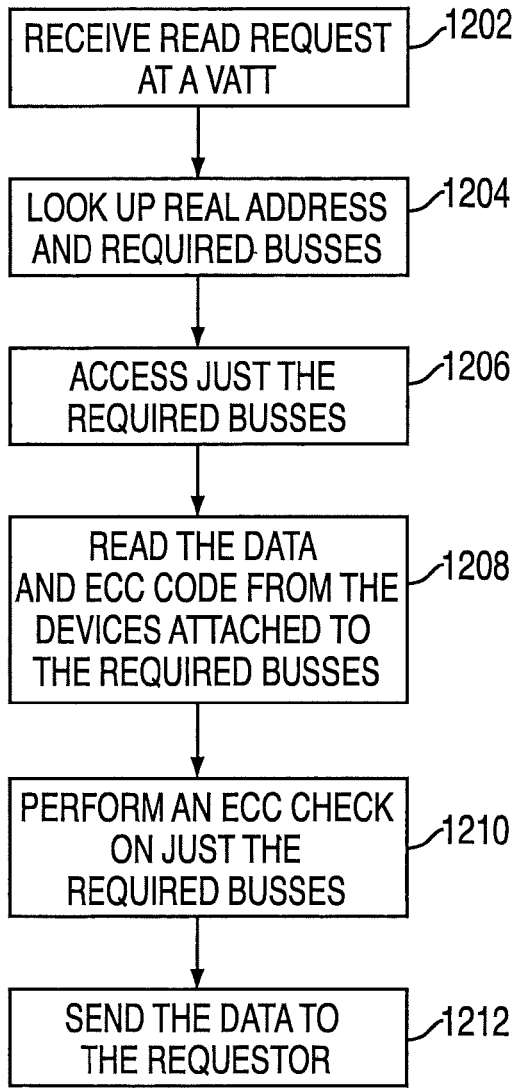
FIG. 12 is a process flow for processing a read request in accordance with exemplary embodiments.

FIG. 12 is a process flow for processing a memory access request that is a read request according to exemplary embodiments. At block 1202, a read request, including a virtual address, is received from the CPU 906 or cache memory 908 by the VATT 938. At block 1204, the virtual address is used by the VATT 938 to find the associated real address(es) as well as to access hint information (or a hint state) defining the optimal bus 806 utilization to process the read request. In exemplary embodiments, the access hint specifies how many bytes of data should be read to satisfy the memory access request, in other embodiments, the access hint specifies which busses 806 should be accessed to process the read request (also referred to as the interleave mode). At block 1206, only the bus(ses) 806 derived based on the access hint is activated and accessed by the memory controller 804. At block 1208 in FIG. 12, the data and ECC code are read from the memory devices 814 on module(s) 810 attached to the bus(ses) 806 being accessed by the memory controller 804. At block 1210, an ECC check is performed on just the accessed bus(ses) 806 and at block 1212, the data is sent to the requestor.

Figure 13:
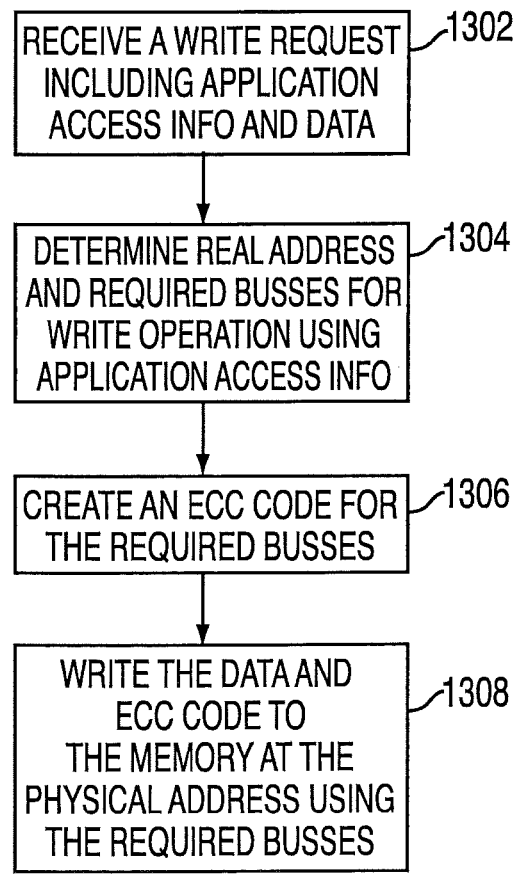
FIG. 13 is a process flow for processing a write request in accordance with exemplary embodiments.

FIG. 13 is a process flow for processing a memory access request that is a write request according to exemplary embodiments. At block 1302, a write request, including application access information and data to be written is initiated by the CPU 906 or cache memory 908 in processor 902. At block 1304, in response to this access request, the VAAT 938 is accessed to identify the "real" address(es) on the memory devices 814, as well as the associated bus(ses) 806 to be used for the write operation, as stored by the operating systems (OS) during the creation of that portion of the VATT 938 during the initial start-up of the application software, or during a period during operation when application software requests memory resource for data. At block 1306, an ECC code is created for just the associated busses 806 using the circuitry 1038, with the ECC code applied across eight bytes, 16 bytes or 32 bytes of data in the exemplary embodiment. At block 1308, the data and ECC code is written to the memory device(s) 810, by memory controller 936 at the physical address using only the associated bus(ses) 806.

Although FIG. 10 shows only a subset of the key elements constituting the memory controller 804, the memory controller function is well known in the art to further comprise control logic to direct all internal operations as well as the interface to the one or more processors, the one or more memory busses, one or more I/O interfaces and other subsystems normally found in a computer system. In addition, ECC circuitry may or may not reside in the memory controller 804, and if present, may or may not be activated for a given application.

Exemplary embodiments, such as those described herein offer significant system performance benefit potential by enabling a software application to dynamically control the memory access method, thereby permitting the selection of the optimal memory access methods (e.g., the channel(s), associated bus(ses) and/or ECC utilization) for a given operation. Application software that does not include memory access "hint" information will result in traditional memory access methods, e.g., the use of all available memory access channels and associated busses for all accesses, thereby also eliminating the potential to complete simultaneous independent memory accesses.

As used herein the term "memory devices" 814 are generally defined as integrated circuits that are composed primarily of memory (storage) cells, such as DRAMs (Dynamic Random Access Memories), SRAMs (Static Random Access Memories), FeRAMs (Ferro-Electric RAMs), asynchronous RAMs, MRAMs (Magnetic Random Access Memories), Flash Memory and other forms of random access and related memories that store information (temporarily or long-term) in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs, DDR (Double Data Rate) Synchronous DRAMs of any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Information passing to the memory devices 814 from memory controller 806 will generally be composed of a minimum of address, command and data, and may include other signals generally associated with requesting or reporting status or error conditions, resetting the memory, completing memory or logic initialization and other related functional, configuration or related information. Information passing from the memory devices 810 may include any or all of this information, however generally will not include address and command information. This information may be communicated using communication methods consistent with normal memory device interface specifications (which are generally parallel in nature), the information may be encoded into a 'packet' structure—which may be consistent with future memory interfaces or which may be memory technology-independent to enable the subsystem to operate independently of the memory technology by converting the received information into the format required by the receiving device(s).

Figure 14:
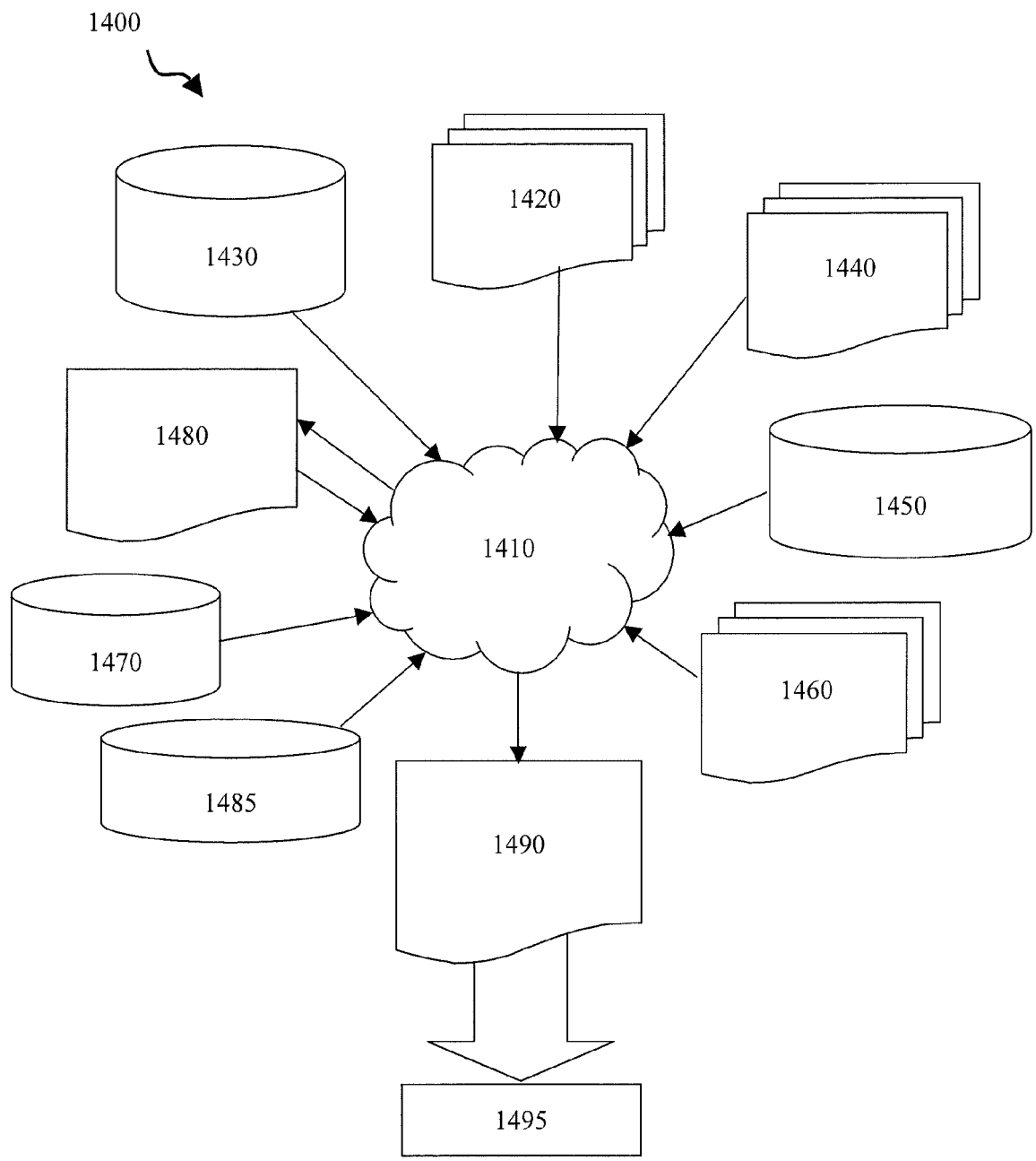
FIG. 14 is a flow diagram of an exemplary design process used in design, manufacturing and/or test.

FIG. 14 is a block diagram illustrating an example of a design flow 1400. Design flow 1400 may vary depending on the type of IC being designed. For example, a design flow 1400 for building an application specific IC (ASIC) will differ from a design flow 1400 for designing a standard component. Design structure 1410 is preferably an input to a design process 1420 and may come from an IP provider, a core developer, or other design company or may be generated by the operator of the design flow, or from other sources. Design structure 1410 comprises circuit embodiment 900 or 1000 in the form of schematics or HDL, a hardware-description language, (e.g., Verilog, VHDL, C, etc.). Design structure 1410 may be contained on one or more machine readable medium(s). For example, design structure 1410 may be a text file or a graphical representation of circuit embodiment 900 illustrated in FIG. 9 or circuit embodiment 1000 illustrated in FIG. 10 Design process 1420 synthesizes (or translates) circuit embodiment 900 or 1000 into a netlist 1430, where netlist 1430 is, for example, a list of wires, transistors, logic gates, control circuits, I/O, models, etc., and describes the connections to other elements and circuits in an integrated circuit design and recorded on at least one of a machine readable medium. This may be an iterative process in which netlist 1430 is resynthesized one or more times depending on design specifications and parameters for the circuit.

Design process 1420 includes using a variety of inputs; for example, inputs from library elements 1435 which may house a set of commonly used elements, circuits, and devices, including models, layouts, and symbolic representations, for a given manufacturing technology (e.g., different technology nodes, 32 nm, 45 nm, 90 nm, etc.), design specifications 1440, characterization data 1450, verification data 1460, design rules 1470, and test data files 1480, which may include test patterns and other testing information. Design process 1420 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 1420 without deviating from the scope and spirit of the invention. The design structure of the invention embodiments is not limited to any specific design flow.

Design process 1420 preferably translates embodiments of the invention as shown in FIG. 9 and/or FIG. 10, along with any additional integrated circuit design or data (if applicable), into a second design structure 1490. Second design structure 1490 resides on a storage medium in a data format used for the exchange of layout data of integrated circuits (e.g. information stored in a GDSII (GDS2), GL1, OASIS, or any other suitable format for storing such design structures). Second design structure 1490 may comprise information such as, for example, test data files, design content files, manufacturing data, layout parameters, wires, levels of metal, vias, shapes, data for routing through the manufacturing line, and any other data required by a semiconductor manufacturer to produce embodiments of the invention as shown in FIG. 9 and/or FIG. 10. Second design structure 1490 may then proceed to a stage 1495 where, for example, second design structure 1490: proceeds to tape-out, is released to manufacturing, is released to a mask house, is sent to another design house, is sent back to the customer, etc.

Technical effects and benefits of exemplary embodiments include the ability to retrieve data from memory devices in fewer clock cycles by allowing one or more memory access requests to be performed concurrently. Concurrent execution is possible when two memory access requests require access to different busses to be completed. Access hint information is utilized by the memory controller to determine what busses are required for a current memory access request. Based on this information, the memory controller can determine if there is another memory access request in the queue that can be performed concurrently with the current memory access request (i.e., one that used one or more different busses). In addition, exemplary embodiments provide ECC functions for only the busses utilized by a memory access request, thereby providing ECC protection of the data on the one or more busses being utilized.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A design structure embodied in a machine readable storage medium used in a design process, the design structure comprising:
a computer memory system for storing and retrieving data, including a memory including a plurality of memory devices organized into one or more physical groups, wherein each group is accessible via an associated bus for transferring data and control information;
a memory controller for receiving and responding to memory access requests that include application access information to control access pattern and data organization within the memory, the responding including accessing one or more memory devices in one or more of the physical groups via the associated busses; and
a virtual memory management system including a plurality of page table entries for mapping virtual memory addresses to real addresses in the memory and also including hint states in the page table entries responsive to memory allocation requests and application access information for indicating how real memory for associated pages is to be physically organized within the memory, and a means for conveying a hint state to the memory controller when a memory; and
wherein the responding further includes selecting which of the associated busses will be used to satisfy the memory access request responsive to the physical memory organization conveyed to the memory controller in the hint state access request is directed to the memory controller to access the memory.

2. The design structure of claim 1, wherein the responding further includes selecting which error detection and correction logic will be utilized to protect data integrity, the selection responsive to the physical memory organization state conveyed to the memory controller in the hint state.

3. The design structure of claim 1, wherein the responding further includes grouping multiple pending memory access requests for optimal memory throughput by servicing pending requests from pending or queued requests which have complementary interleave attributes at the same time.

4. The design structure of claim 1, wherein the virtual memory management system transmits a page table entry associated with the memory access request to the memory controller.

5. The design structure of claim 1, wherein the responding further includes generating and checking error correction codes for information transferred on the associated busses, wherein the generating is performed on data being written to one or more memory devices and the checking is performed on data being read from one or more memory devices.

6. The design structure of claim 1, wherein the design structure comprises a netlist describing the apparatus for implementing speculative clock gating of digital logic circuits included in a multiple stage pipeline design.

7. The design structure of claim 1, wherein the design structure resides on storage medium as a data format used for the exchange of layout data of integrated circuits.

8. The design structure of claim 1, wherein the design structure includes at least one of test data files, characterization data, verification data, programming data, or design specifications.

9. A design structure embodied in a machine readable storage medium used in design process, the design structure comprising:
memory system including a plurality of busses for transferring information to memory devices; and
a memory controller in communication with the busses for receiving memory access requests and for initiating an information transfer on one or more of the busses to respond to the memory access requests, wherein the memory controller determines on a cycle by cycle basis which of the busses are required to respond to each of the memory access requests based on a memory access pattern associated with each memory access request; and
a virtual address translation table (VATT) which includes an address range and an access hint defined by an operating system (OS), wherein the access hint affects all subsequent memory access requests to the address range, the access hint can be changed by the OS during system operation, and the access hint is utilized by the memory controller to determine which of the busses are required to satisfy the memory access request.

10. The design structure of claim 9 wherein any unused busses for one of the memory access requests may be utilized concurrently to perform an other of the memory access requests.

11. The design structure of claim 9 wherein the access hint includes the one or more busses required to satisfy the memory access request for the address range.

12. The design structure of claim 9 wherein the access hint includes a preferred access granularity for the address range.

13. The design structure of claim 9 wherein the VATT includes entries defining how virtual addresses are mapped to real addresses on the memory devices.

14. The design structure of claim 9 wherein a memory error correction code (ECC) generation and checking circuit is operable across one or more of the busses.

15. The design structure of claim 9, wherein the design structure comprises a netlist describing the apparatus for implementing speculative clock gating of digital logic circuits included in a multiple stage pipeline design.

16. The design structure of claim 9, wherein the design structure resides on storage medium as a data format used for the exchange of layout data of integrated circuits.

17. The design structure of claim 9, wherein the design structure includes at least one of test data files, characterization data, verification data, programming data, or design specifications.

* * * * *